United States Patent
Ly et al.

(10) Patent No.: US 10,728,916 B2
(45) Date of Patent: Jul. 28, 2020

(54) DESIGNS FOR REMAINING MINIMUM SYSTEM INFORMATION (RMSI) CONTROL RESOURCE SET (CORESET) AND OTHER SYSTEM INFORMATION (OSI) CORESET

(71) Applicant: QUALCOMM Incorporated, San Diego, CA (US)

(72) Inventors: Hung Dinh Ly, San Diego, CA (US); Heechoon Lee, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/170,558

(22) Filed: Oct. 25, 2018

(65) Prior Publication Data

US 2019/0159180 A1 May 23, 2019

Related U.S. Application Data

(60) Provisional application No. 62/588,245, filed on Nov. 17, 2017.

(51) Int. Cl.
*H04W 72/12* (2009.01)
*H04L 5/00* (2006.01)
(Continued)

(52) U.S. Cl.
CPC ....... *H04W 72/1263* (2013.01); *H04L 5/0044* (2013.01); *H04L 5/0048* (2013.01);
(Continued)

(58) Field of Classification Search
CPC ........... H04W 72/1263; H04W 56/001; H04W 24/02; H04W 72/042; H04W 72/12;
(Continued)

(56) References Cited

U.S. PATENT DOCUMENTS

2010/0128614 A1* 5/2010 Kuusela ................ H04L 47/781
370/252
2011/0305211 A1* 12/2011 Lunttila ................ H04L 5/0007
370/329
(Continued)

OTHER PUBLICATIONS

Asustek: "Resource Allocation Type Modification to Reduce PDCCH Overhead", 3GPP DRAFT; R1-081317 Resource Allocation Type Modification to Reduce PDCCH Overhead, 3rd Generation Partnership Project (3GPP), Mobile Competence Centre; 650, Route Des Lucioles; F-06921 Sophia-Antipolis Cedex; France, vol. RAN WG1, No. Shenzhen, China; Mar. 26, 2008, Mar. 26, 2008, XP050109744, [retrieved on Mar. 26, 2008], 3 pages.
(Continued)

*Primary Examiner* — Sharad Rampuria
(74) *Attorney, Agent, or Firm* — Patterson + Sheridan, L.L.P./QUALCOMM Incorporated

(57) ABSTRACT

Certain aspects of the present disclosure provide techniques and apparats relating to designs for the remaining minimum system information (RMSI) control resource set (CORESET) and the other system information (OSI) CORESET. In certain aspects, a wireless communication device (e.g., user equipment) is enabled to determine the location of Type0-PDCCH common search space CORESET and the OSI CORESET in the frequency and time domains based on the location of the synchronization signal block (SSB) transmissions in the frequency and time domains. Determining the location of the RMSI CORESET and the OSI CORESET frequency and time resources enables the UE to receive the RMSI CORESET and the OSI CORESET, respectively.

54 Claims, 32 Drawing Sheets

(51) Int. Cl.
*H04W 56/00* (2009.01)
*H04W 24/02* (2009.01)
*H04W 72/04* (2009.01)

(52) U.S. Cl.
CPC .......... *H04L 5/0053* (2013.01); *H04W 24/02* (2013.01); *H04W 56/001* (2013.01); *H04W 72/042* (2013.01); *H04L 5/0091* (2013.01)

(58) Field of Classification Search
CPC .... H04W 76/00; H04W 72/04; H04L 5/0053; H04L 5/0044; H04L 5/0048; H04L 5/0091; H04B 7/2123; H04J 2203/0069; H04Q 2213/394
See application file for complete search history.

(56) References Cited

U.S. PATENT DOCUMENTS

| | | | |
|---|---|---|---|
| 2017/0117997 A1* | 4/2017 | Park | ...................... H04L 5/0057 |
| 2019/0159226 A1 | 5/2019 | Ly et al. | |
| 2019/0215130 A1* | 7/2019 | Aiba | ..................... H04B 17/345 |

OTHER PUBLICATIONS

Huawei et al., "CORESET configuration and Search Space Design", 3GPP DRAFT; R1-1717062, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 (Oct. 8, 2017), XP051340253, Retrieved from the Internet: URL:http://www.3gpp.org/ftp/Meetings_3GPP_SYNC/RAN1/Docs/ [retrieved on Oct. 8, 2017], 14 pages.

Nokia et al., "On Other System Information Delivery", 3GPP DRAFT; R1-1718614, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017 (Oct. 8, 2017), XP051341788, Retrieved from the Internet: URL:http://www.3gpp.org/ftp/Meetings_3GPP_SYNC/RAN1/Docs/ [retrieved on Oct. 8, 2017], 4 pages.

ZTE et al., "Remaining Details of RMSI", 3GPP Draft; R1-1715378, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21,2017, Sep. 17, 2017, XP051338846, Retrieved from the Internet: URL:http://www.3gpp.org/ftp/Meetings_3GPP_SYNC/RAN1/Docs/ [retrieved on Sep. 17, 2017], 12 pages.

International Search Report and Written Opinion—PCT/US2018/057882—ISA/EPO—dated Apr. 30, 2019.

Qualcomm Incorporated: "Remaining System Information Delivery Consideration," 3GPP Draft; R1-1713376 Remaining System Information Delievery Consideration, 3rd Generation Partnership Project(3GPP), Mobile Competence Centre; 650, Route Des Lucioles; F-06921 Sophia-Antipolis Cedex, vol. RAN WG1, No. Prague, Czech Republic; Aug. 21, 2017-Aug. 25, 2017, Aug. 20, 2017, XP051316181, 8 pages, Retrieved from the Internet: URL: http://www.3gpp.org/ftp/Meetings_3GPP_SYNC/RAN1/Docs/ [retrieved on.

Samsung: "Remaining details on Other System Information Delivery," 3GPP Draft; R1-1717579-NR Other System Infor Delivery, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051340765, 2 Pages, Retrieved from the Internet: URL: http://www.3gpp.org/ftp/Meetings_3GPP_SYNC/RAN1/Docs/ [retrieved on Oct. 8, 2017] section 2, p. 2, par. Following.

Samsung: "Remaining Details on Synchronization Signal," 3GPP Draft; R1-1717579, 3rd Generation Parternship Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340762, 10 pages, Retrieved from the Internet: URL: http://www.3gpp.org.ftp/Meetings_3GPP_SYNC/RAN1/Docs/ [retrieved on Oct. 8, 2017] section 3 section 4, subsection SS block to RMSI.

* cited by examiner

| RMSI SCS | RMSI CORESET BW | Offset Step | Offset Values |
|---|---|---|---|
| RMSI SCS = SSB SCS | 24 | 1 | 0-4 |
| | 48 | 1 | 0-28 |
| RMSI SCS = 0.5 * SSB SCS | 24 | 1 | -8 |
| | 48 | 1 | 0-8 |
| RMSI SCS = 2 * SSB SCS | 24 | 1 | 0-14 |
| | 48 | 1 | 0-34 |

FIG. 13

| RMSI SCS | RMSI CORESET BW (RBs) | Offset Step (RBs) | Offset Values (in RBs) |
|---|---|---|---|
| RMSI SCS = SSB SCS | 24 | 2 | 0, 2, 4 |
| | 48 | 6 | 0, 6, 12, 18, 24 |
| RMSI SCS = 0.5*SSB SCS | 24 | 1 | -8 |
| | 48 | 2 | 0, 2, 4, 6, 8 |
| RMSI SCS = 2*SSB SCS | 24 | 6 | 0, 6, 12 |
| | 48 | 8 | 0, 8, 16, 24, 32 |

| RMSI SCS | RMSI CORESET BW (RB) | Guard (RB) | Offset Values (in RBs) |
|---|---|---|---|
| SSB SCS | 24 | G0 | -(20 + G0), {6, 12, 18, 24} + G0 |
| SSB SCS | 48 | G0 | -(20 + G0), {6, 18, 30, 42, 48} + G0 |
| 0.5*SSB SCS | 24 | G1 | -(40 + G0), {6, 12, 18, 24} + G0 |
| 0.5*SSB SCS | 48 | G1 | -(40 + G), {6, 18, 30, 42, 48} + G1 |
| 2*SSB SCS | 24 | G2 | -(10 + G), {6, 12, 18, 24} + G2 |
| 2*SSB SCS | 48 | G2 | -(10 + G), {6, 18, 30, 42, 48} + G2 |

| FIG. 18A | FIG. 18B |
|----------|----------|
| FIG. 18C | FIG. 18D |

FIG. 18

| | | | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|
| 30 | 30 | 1-symbol, TDM | | | | | ▓ | ▓ | | | ▓ | ▓ | ▓ | ▓ | | |
| | | 2-symbol, TDM (RMSI CORESET every 2 slots) | | ▓ | ▓ | ▓ | | | | | | | | | | |
| | | 2-symbol, TDM, 3rd SSB in every 2 slotss OFF | | ▓ | ▓ | ▓ | | | | | | | | | | |
| | | 2-symbol, w/ RMSI CORESET in every 2 slots w/ SSBs but every slot w/o SSBs | | | | | | | | | | | | | | |
| SSB P2 | | | 0 | 1 | 2 | 3 | 4 | 5 | 6 | 7 | 8 | 9 | 10 | 11 | 12 | 13 |
| 30 | 30 | 1-symbol | | ▓ | ▓ | ▓ | ▓ | ▓ | | | ▓ | ▓ | ▓ | ▓ | | |
| | | 2-symbol | | ▓ | ▓ | ▓ | | | | | | | | | | |
| | | 2-symbol (at the beginning of slots only) | | | | | | | | ▓ | | | | | | |
| | | 3-symbol in non-SSB slots | | | | | | | ▓ | ▓ | | | | | | |
| | 15 | 1-symbol | | ▓ | | | ▓ | ▓ | ▓ | | ▓ | ▓ | ▓ | ▓ | | |
| | | 2-symbol in non-SSB slots | | | | | | | | ▓ | | | | | | |
| | | 3-symbol in non-SSB slots | | | | | | | ▓ | ▓ | | | | | | |

FIG. 18C

| FIG. 19A | FIG. 19B |

FIG. 19

DESIGNS FOR REMAINING MINIMUM SYSTEM INFORMATION (RMSI) CONTROL RESOURCE SET (CORESET) AND OTHER SYSTEM INFORMATION (OSI) CORESET

CROSS-REFERENCE TO RELATED APPLICATIONS

This application claims the benefit of U.S. Application Ser. No. 62/588,245 entitled "DESIGNS FOR REMAINING MINIMUM SYSTEM INFORMATION (RMSI) CONTROL RESOURCE SET (CORESET) AND OTHER SYSTEM INFORMATION (OSI) CORESET," which was filed Nov. 17, 2017. The aforementioned application is herein incorporated by reference in its entirety.

FIELD

Aspects of the present disclosure relate generally to wireless communications systems, and more particularly, to designs for remaining minimum system information (RMSI) control resource set (CORESET) and other system information (OSI) CORESET.

BACKGROUND

Wireless communication systems are widely deployed to provide various telecommunication services such as telephony, video, data, data, messaging, broadcasts, etc. The systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more base stations may define an e NodeB (eNB). In other examples (e.g., in a NR, next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, a Next Generation Node B (gNB), etc.). BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to designs for the remaining minimum system information (RMSI) control resource set (CORESET) and the other system information (OSI) CORESET.

Certain aspects of the present disclosure provide a method for wireless communications by a user equipment (UE). The method includes receiving a Type0-physical downlink control channel (PDCCH) common search space control resource set (CORESET) configuration and a physical resource block (PRB) grid offset in a physical broadcast channel (PBCH) carried by a synchronization signal block (SSB), the Type0-PDCCH common search space CORESET configuration comprising an indication indicative of one or more offset values corresponding to one or more offsets relating to frequency locations of Type0-PDCCH common search space CORESET resource blocks (PRBs) relative to frequency locations of PRBs of the SSB. The method also includes aligning a PRB grid of SSB with a PRB grid of Type0-PDCCH common search space CORESET by applying the PRB grid offset. The method also includes mapping the indication to the one or more offset values using a mapping stored by the UE. The method also includes by determining the frequency locations of the Type0-PDCCH common search space CORESET PRBs based on the one or more offset values and the frequency locations of the SSB PRBs. The method also includes receiving Type0-PDCCH in the Type0-PDCCH common search space CORESET.

Certain aspects of the present disclosure provide a method for wireless communications by a user equipment (UE). Certain aspects of the present disclosure provide a method for wireless communications by a user equipment (UE). The method includes determining frequency locations of Type0-physical downlink control channel (PDCCH) common search space control resource set (CORESET) in a physical downlink shared channel (PDSCH). The method further includes determining frequency locations of Type0a-physical downlink control common search space CORESET in the PDSCH based on the frequency locations of the Type0-PDCCH common search space CORESET. The method further includes receiving the Type0a-PDCCH common search space CORESET.

Certain aspects of the present disclosure provide a method for wireless communications by a base station (BS). The method includes transmitting a synchronization signal block (SSB) to a user equipment, the SSB comprising a physical broadcast channel (PBCH) having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to one or more offsets relating to frequency locations of Type0-PDCCH common search space CORESET resource blocks (PRBs) relative to frequency locations of PRBs of the SSB. The method further includes transmitting a Type0-PDCCH in the Type0-PDCCH common search space CORESET for reception by the UE.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 13 illustrates an example table showing possible number of frequency offset values that a base station (BS) may indicate to a UE in the indication in various scenarios, in accordance with certain aspects of the present disclosure.

FIG. 18 illustrates how a collection of FIGS. 18A-18D may be arranged to show a complete figure including example mappings between the RMSI timing locations and the SSB timing locations for a frequency band below 6 GHz.

FIGS. 18A-18D illustrate example mappings between the RMSI timing locations and the SSB timing locations for a frequency band below 6 GHz, in accordance with certain aspects of the present disclosure.

FIG. 19 illustrates how a collection of FIGS. 19A-18B may be arranged to show a complete figure including example mappings between the RMSI timing locations and the SSB timing locations for a frequency band above 6 GHz.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to systems and methods for determining the locations of remaining minimum system information (RMSI) control resource set (CORESET) and other system information (OSI) CORESET in the time and frequency domains.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Figure 1:
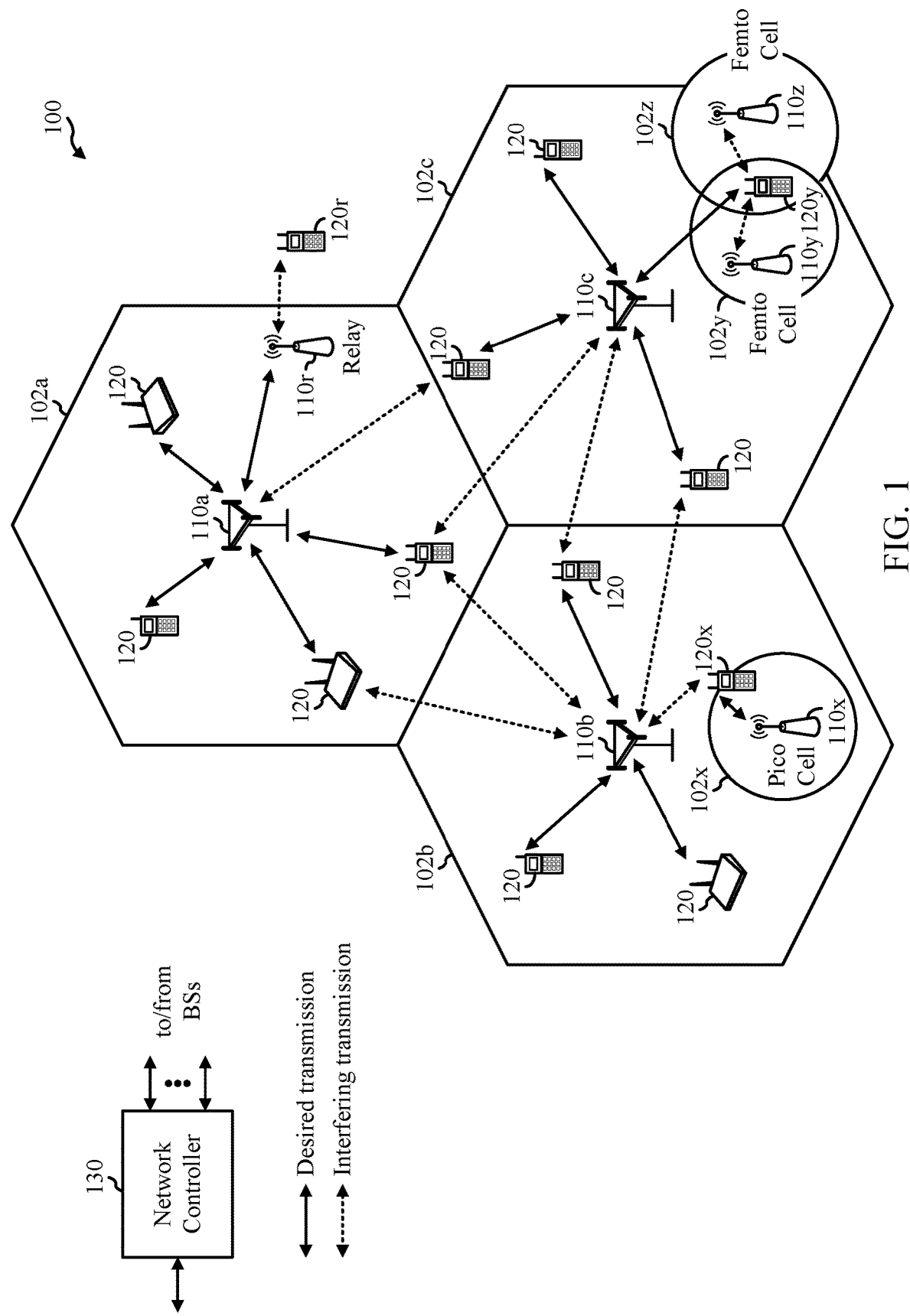
FIG. 1 is a block diagram conceptually illustrating an example telecommunications system, in accordance with certain aspects of the present disclosure.

In certain aspects, cell synchronization procedures may involve a base station (e.g., BS 110 as described in relation to FIG. 1) broadcasting a set of signals in a SSB to facilitate cell search and synchronization by a UE (e.g., UE 120 as described in relation to FIG. 1). An SSB includes a primary synchronization signal (PSS), a secondary synchronization signal (SSS), and a physical broadcast channel (PBCH). An SSB transmitted by a base station helps the UE determine system timing information such as a symbol timing based on the PSS, cell identification based on the PSS and the SSS, and other parameters needed for initial cell access based on system information sent in the PBCH.

The system information, in some cases, may include a minimum system information (MSI) as well as other system information (OSI). In some cases, MSI includes information carried by the PBCH (similar to the master information block (MIB) in LTE) as well as the remaining minimum system information (RMSI). The information carried by the PBCH (similar to MIB) is information that is used by the UE to acquire other information from the cell. The RMSI includes information related to the UE's access to the cell as well as radio resource configuration common for all UEs in the cell. The RMSI may be interchangeably referred to as system information block 1 (SIB1), the RMSI CORESET may be interchangeably referred to as Type0-physical downlink control channel (PDCCH) common search space CORESET, the OSI CORESET may be interchangeably referred to as Type0a-physical downlink control channel (PDCCH) common search space CORESET. The RMSI, as described above, is carried by a physical downlink shared channel (PDSCH). UEs are scheduled to communicate using resources of the PDSCH based on information sent in the PDCCH. The PDSCH may also carry the OSI.

The PDCCH (e.g., Type0-PDCCH), that schedules RMSI, may be transmitted in a control resource set (CORESET) within an RMSI PDCCH monitoring window associated with an SSB. In some cases, the RMSI CORESET (Type0-PDCH common search space CORESET) is a CORESET into which the PDCCH, for scheduling the PDSCH that carries the RMSI, is mapped.

Certain embodiments described herein are directed to enabling a wireless communications device, such as a UE (e.g., UE 120), to determine the location of the RMSI CORESET and the OSI CORESET in the frequency and time domains based on the location of the SSB transmissions in the frequency and time domains. Determining the location of the RMSI CORESET and the OSI CORESET frequency and time resources enables the UE to receive the RMSI CORESET and the OSI CORESET, respectively. By receiving the RMSI CORESET, the UE is able to receive the PDCCH (e.g., Type0-PDCCH) in the RMSI CORESET, based on which the UE is able to receive and decode the PDSCH that carries RMSI. Also, the UE may determine the location of the OSI CORESET in the frequency and time domains based on the location of the RMSI CORESET in the frequency and time domains.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, user equipment 120 may receive a remaining minimum system information (RMSI) control resource set (CORESET) configuration in a physical broadcast channel (PBCH) from base station 120. The RMSI CORESET configuration may include an indication that UE 120 may use to determine the locations of the RMSI CORESET frequency resources. In addition, UE 120 may store a mapping of SSB time resources to RMSI CORESET time resources that enables UE 120 to determine locations of RMSI CORESET time resources.

The UE may also determine the time and frequency locations of other system information (OSI) CORESET based on the time and frequency locations of the RMSI CORESET.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell", BS, Next Generation Node B (gNB), Node B, 5G NB, access point (AP), NR BS, NR BS, or transmission reception (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a physical resource block (PRB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 PRBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 subcarriers with a subcarrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240. . . kHz).

Beamforming generally refers to the use of multiple antennas to control the direction of a wavefront by appropriately weighting the magnitude and phase of individual antenna signals (for transmit beamforming). Beamforming may result in enhanced coverage, as each antenna in the array may make a contribution to the steered signal, an array gain (or beamforming gain) is achieved. Receive beamforming makes it possible to determine the direction that the wavefront will arrive (direction of arrival, or DoA). It may also be possible to suppress selected interfering signals by applying a beam pattern null in the direction of the interfering signal. Adaptive beamforming refers to the technique of continually applying beamforming to a moving receiver.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
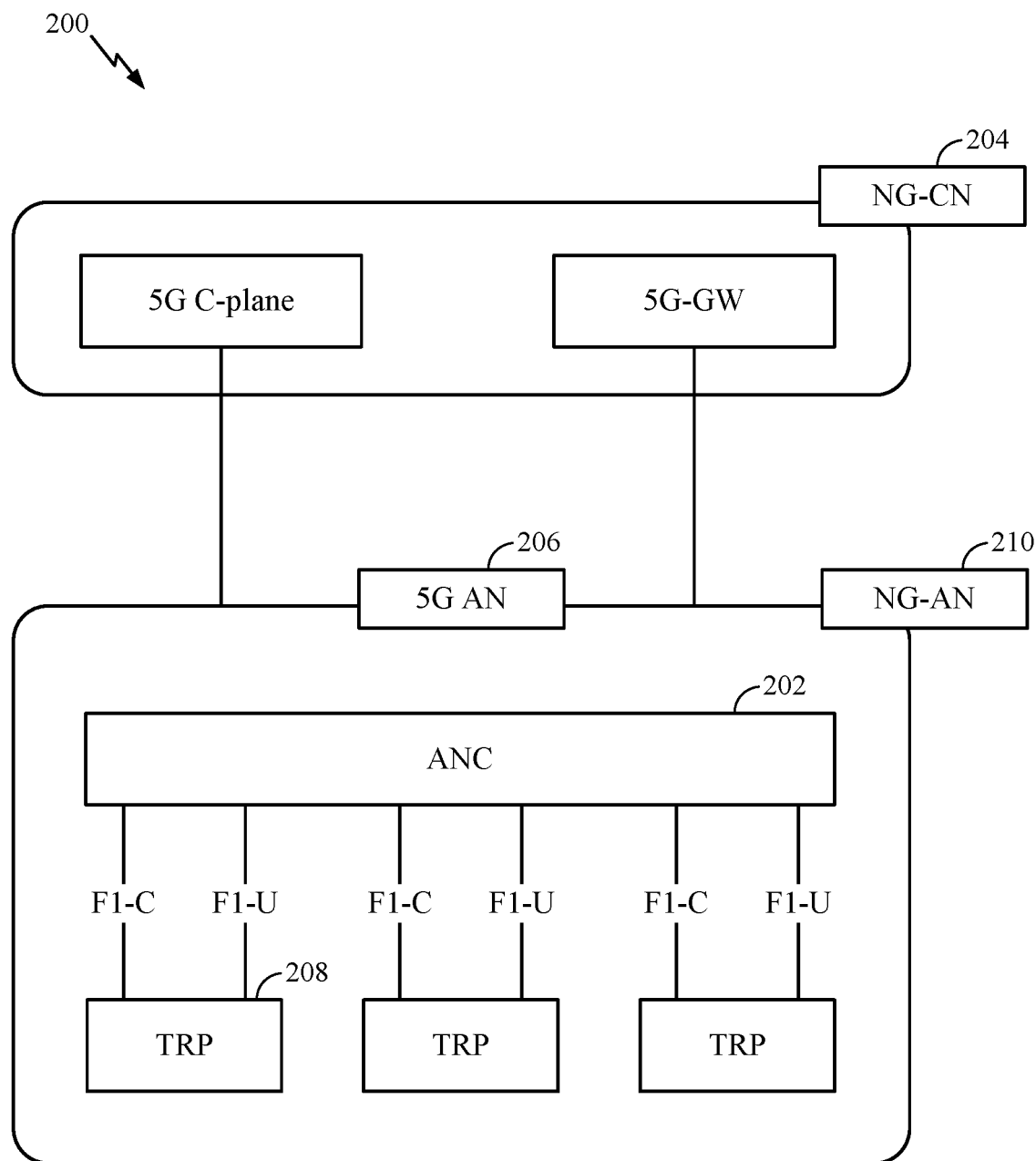
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, Node Bs, gNBs, 5G NBs, APs, or some other term). As described above, a TRP may be used interchangeably with "cell."

The TRPs 208 may be a DU. The TRPs 208 may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR.

The logical architecture may enable cooperation between and among TRPs 208. For example, cooperation may be preset within a TRP and/or across TRPs via the ANC 202. An inter-TRP interface may not be used.

The logical architecture may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
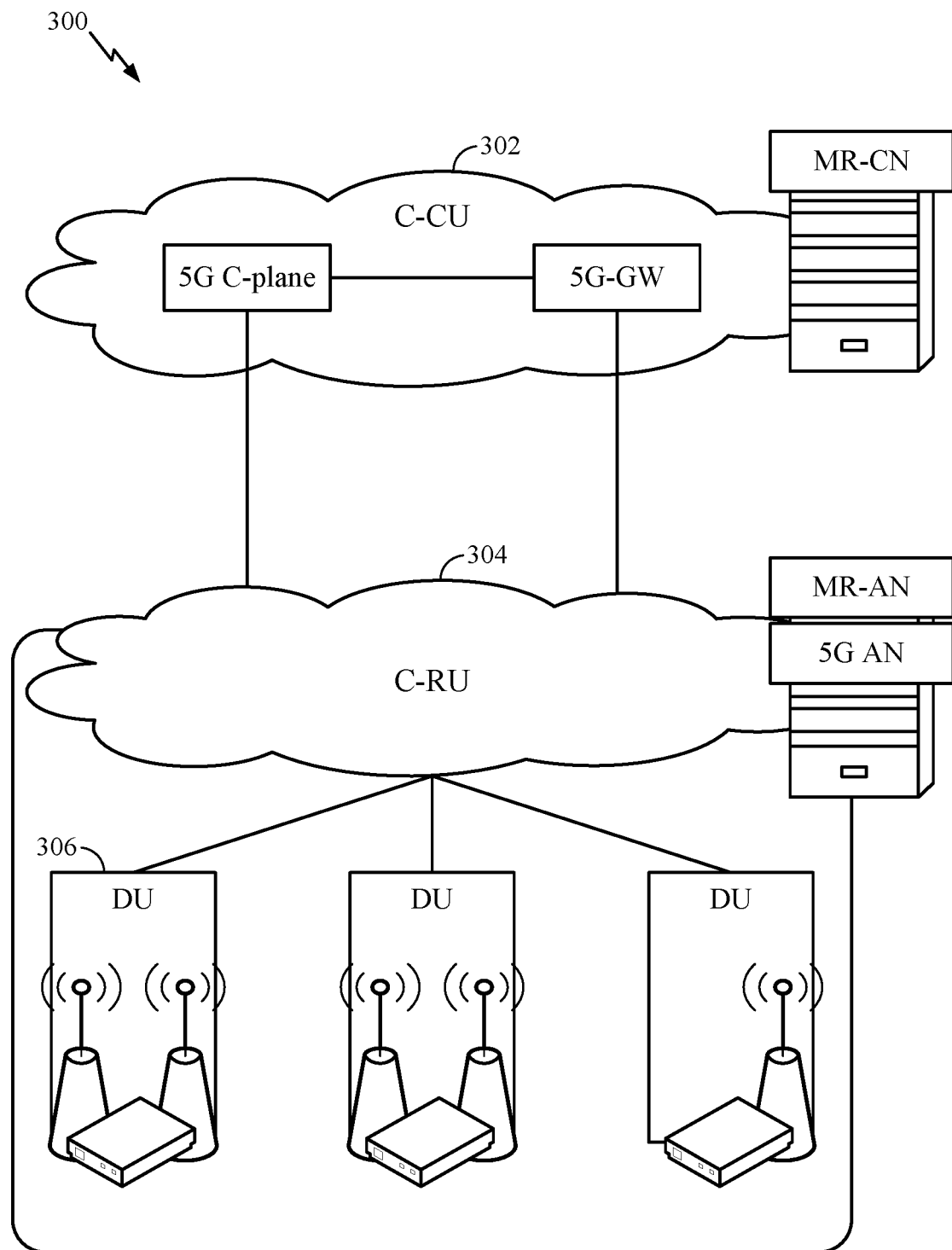
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
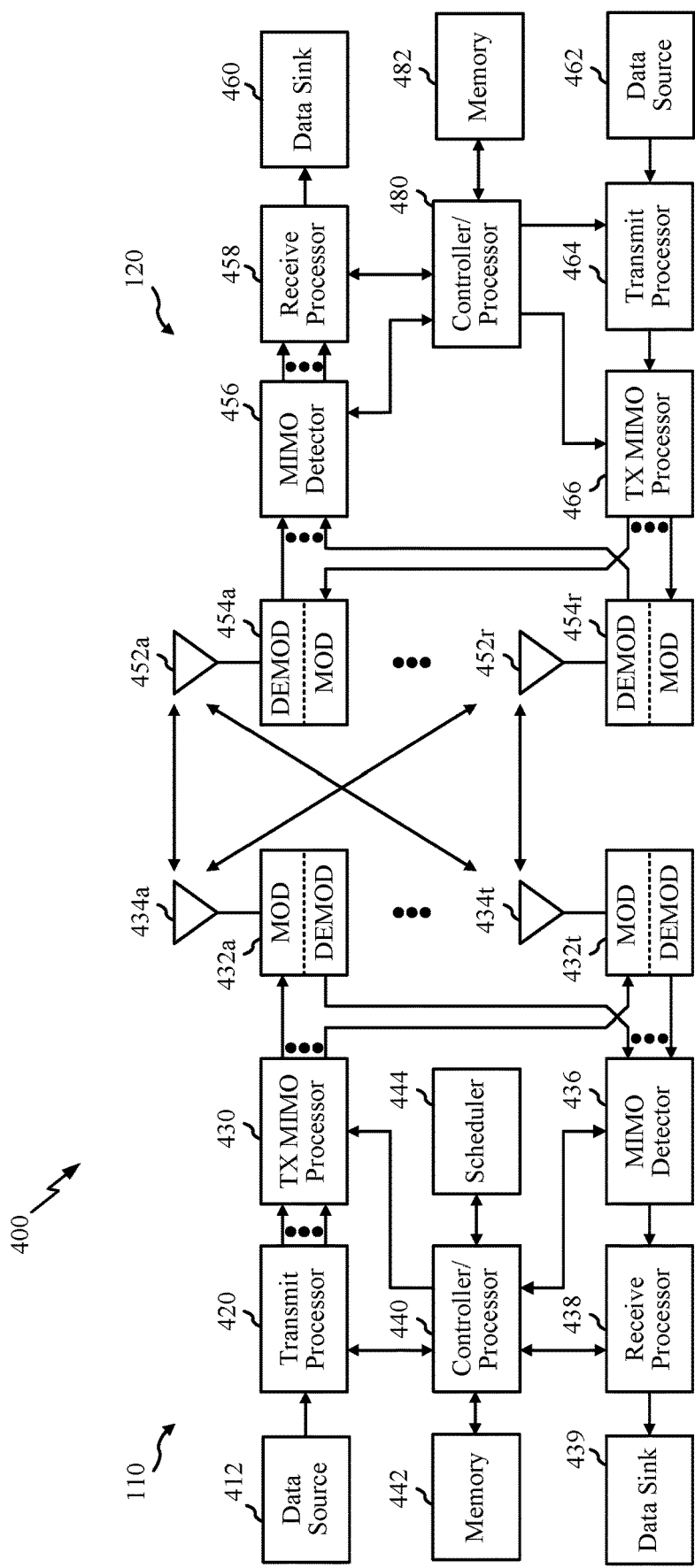
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure.

As described above, the BS 110 may be a gNB, TRP, etc. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 11, 17, and 20.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for a primary synchronization signal (PSS), primary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. As described in more detail below, in some cases, synchronization, reference signals, and broadcast signals may have a flexible bandwidth allocation and may not be centered around the DC tone.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution processes for the techniques described herein. The processor 480 and/or other processors and modules at the UE 120 may also perform or direct, e.g., the execution of the functional blocks illustrated in FIGS. 11, 17, and 20, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
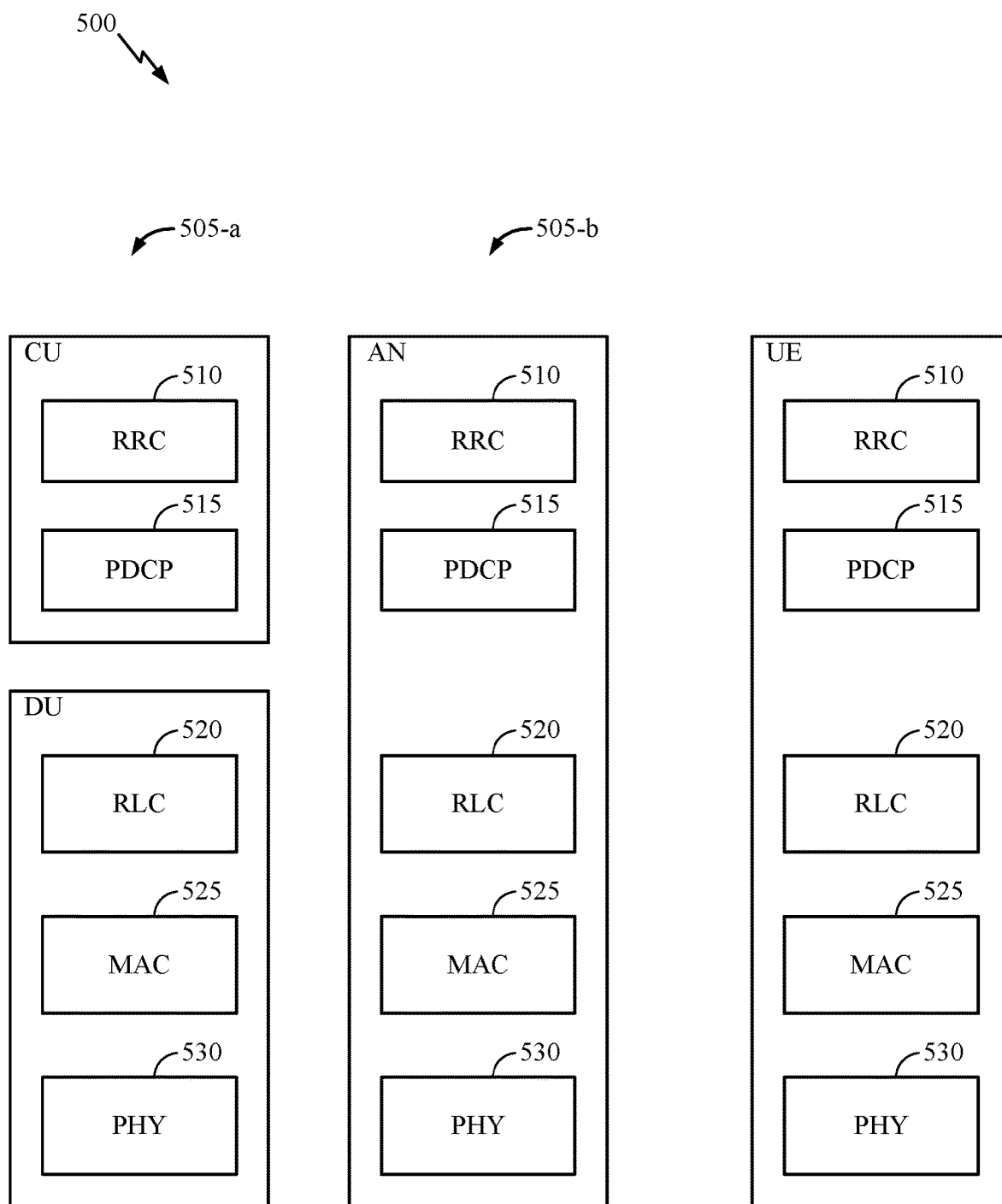
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
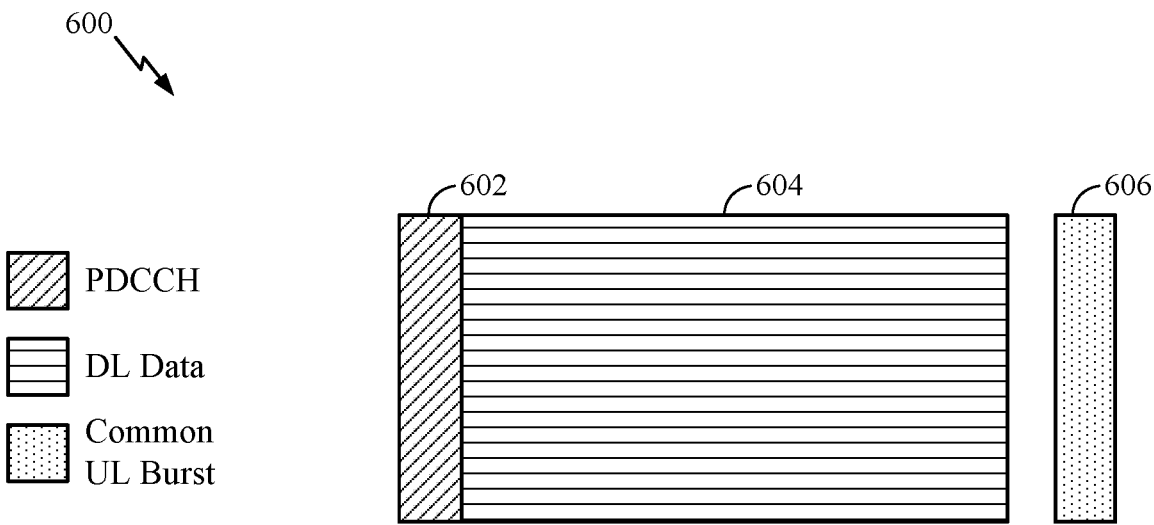
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
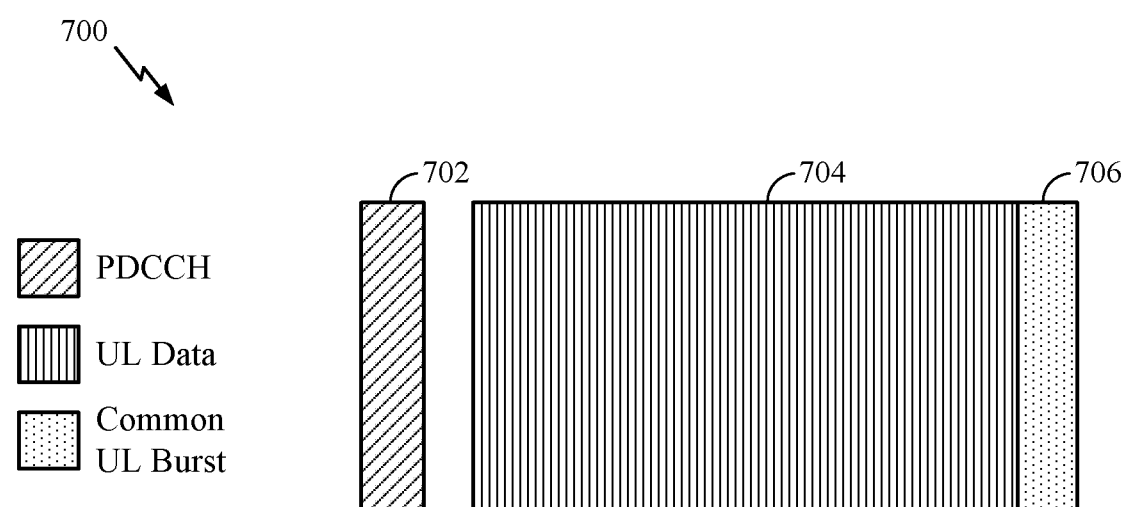
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Synchronization Signal Block Design

In certain aspects, cell synchronization procedures may involve a base station (e.g., BS 110) broadcasting a set of signals in an SSB to facilitate cell search and synchronization by UEs (e.g., UEs 120).

Figure 8:
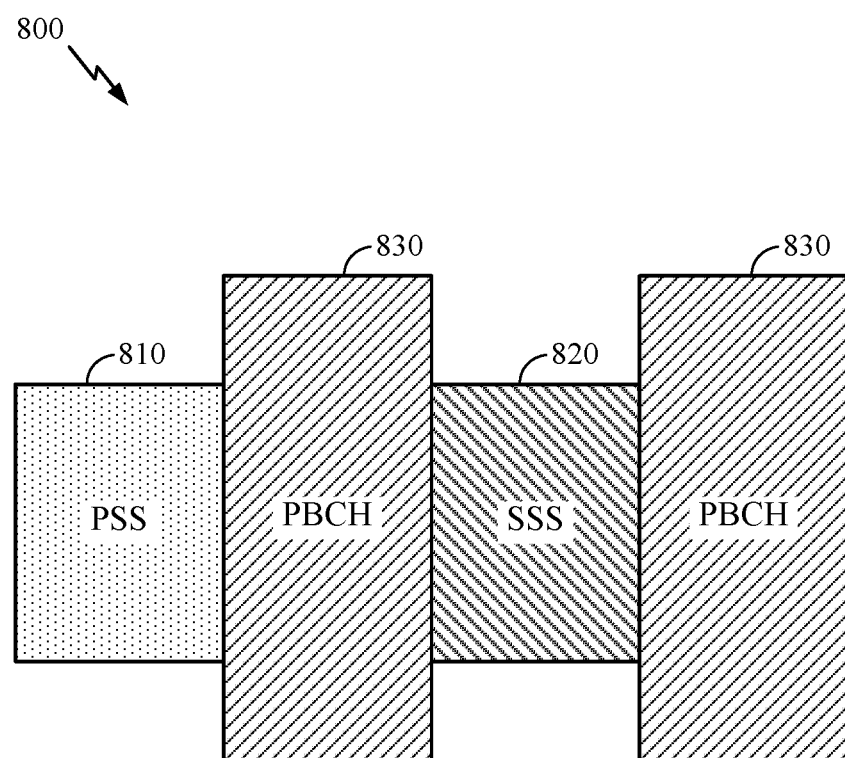
FIG. 8 illustrates an example structure of a synchronization signal block (SSB) broadcasted by a base station, in accordance with aspects of the present disclosure.

FIG. 8 illustrates an example of the structure of a SSB 800 broadcasted by a BS (e.g., BS 110). The configuration of SSB 800 includes a PSS 810, a SSS 820, and PBCH 830 multiplexed between the PSS 810 and SSS 820 as shown in FIG. 8. The PBCH 830 may include reference signals such as demodulation reference signals (DMRS) signals. Accordingly, each SSB 800 transmitted by BS 110 may help the UE 120 determine system timing information such as a symbol timing based on PSS 810, cell identification based on PSS 810 and SSS 820, and other parameters needed for initial cell access based on a Master Information Block (MIB) sent in the PBCH 830.

In some implementations, the PSS 810 and SSS 820 each occupy one symbol in the time domain, while the PBCH 830 occupies two symbols but is split into two parts with a first half in one symbol between the PSS 810 and SSS 820, and a second half in a second symbol after SSS 820, as seen in FIG. 8. In the frequency domain, the PSS 810 and SSS 820 may each occupy 127 resource elements or subcarriers, while the PBCH 830 may occupy 288 resource elements. In some embodiments, a resource element refers to one symbol in one subcarrier of a resource block. For example, when a resource block comprises 12 subcarriers and 7 symbols, the resource block may comprise 84 (12 subcarriers * 7 symbols) resource elements in case of a normal cyclic prefix (72 for extended. CP). The frequency location of the SSB 800 may not necessarily be in the center 6 resource blocks of the frequency band but may vary depending on the sync raster and may be a function of channel raster parameters.

Base station 110 may periodically transmit an SSB 800 to allow UEs 120 the opportunity to synchronize with the system. In certain aspects, the base station 110 may transmit multiple instances of SSBs in a synchronization signal burst (SS burst), instead of, for example, only one instance of PSS and SSS every 5 ms. In a SS burst, multiple SSB transmissions may be sent within a 5 ms time window. The multiple SSB transmissions may allow for coverage enhancements and/or directional beams to UEs in different locations. For example, the BS may transmit SSBs using different transmit beams that are spatially directed to different locations, thereby, allowing UEs in each of those different locations to receive the SSBs. BS 110, however, may be limited by predefined rules with respect to the number of SSBs that can be transmitted within a particular time frame. The limitations may be based on various factors, including the particular subcarrier spacing used by the system and the frequency band in which the system operates.

Figure 9:
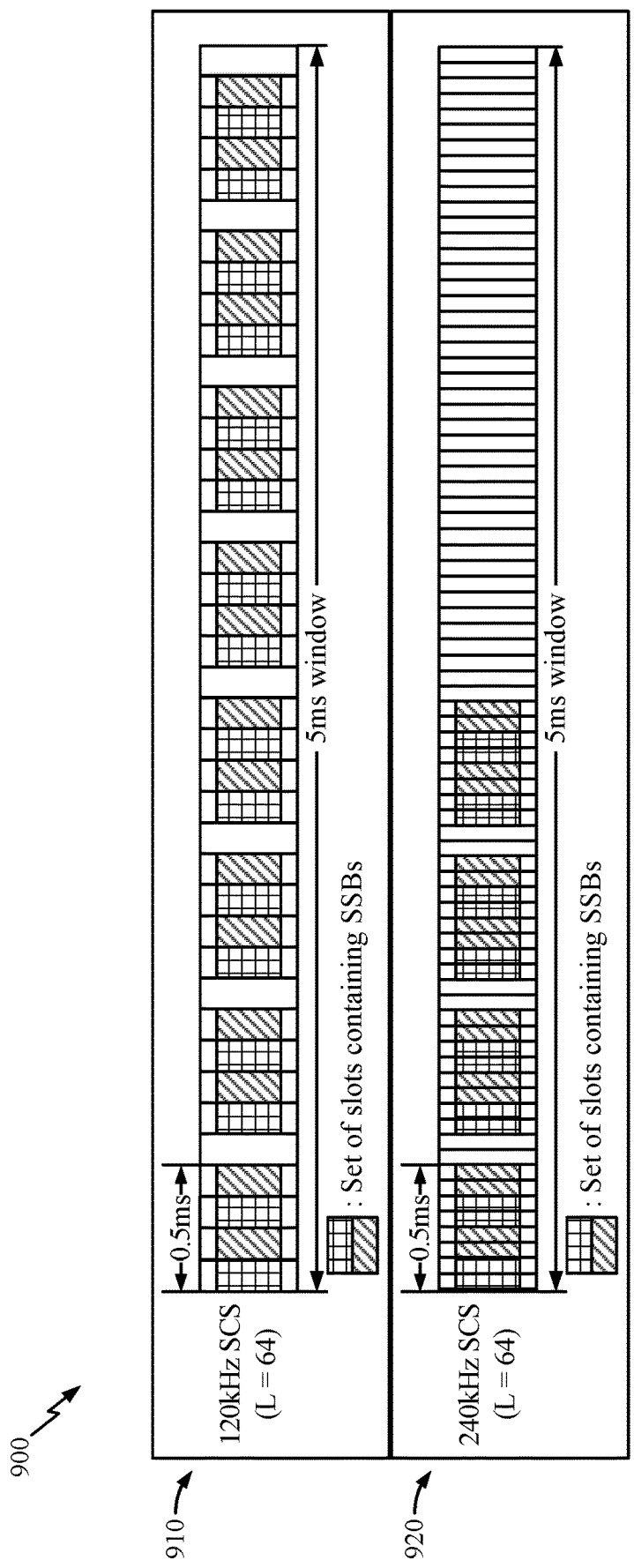
FIG. 9 illustrates example configurations of patterns of SSB transmission opportunities based on various system parameters, in accordance with aspects of the present disclosure.

FIG. 9 illustrates example configurations 900 of patterns of SSBs transmission opportunities based on various system parameters. As shown in FIG. 9, the number of SSB transmission opportunities for a BS 110 and the corresponding locations of the SSB transmission opportunities within a measurement window (e.g., 5 ms window) may depend on the subcarrier spacing employed by the BS and the frequency band in which the BS operates. The UE may measure cell discovery reference signal (DRS) according to periodically configured DRS measurement timing configuration (DMTC) period windows.

The DMTC may be configured for measurements of a serving cell or neighbor cells, or both. Further, the DMTC may be frequency specific or may be applicable to multiple frequencies in various examples. The length of a slot in each configuration may vary depending on the subcarrier spacing used in the configuration. In configuration 910, a subcarrier spacing of 120 kHz is used within an over-6 GHz frequency band (e.g., 60 GHz frequency band). Within a 5 ms window, the base station 110 in this configuration 910 may be allowed to transmit L=64 SSB s (i.e., two SSB s per slot), which may be required to be transmitted according to a particular pattern of allocated resources for the SSB s.

In configuration 920, a subcarrier spacing of 240 kHz is used within a frequency band of over 6 GHz (e.g., 60 GHz), and the maximum number of SSB transmissions is L=64, which may be required to be transmitted according to a particular pattern of allocated resources for the SSB s. The 64 SSB s may be referred to as an SS burst set. The pattern and maximum number of SSBs allowed within a measurement window may vary in other configurations, depending on the subcarrier spacing used and frequency band in which the base station 110 and UE 120 operate.

Figure 10:
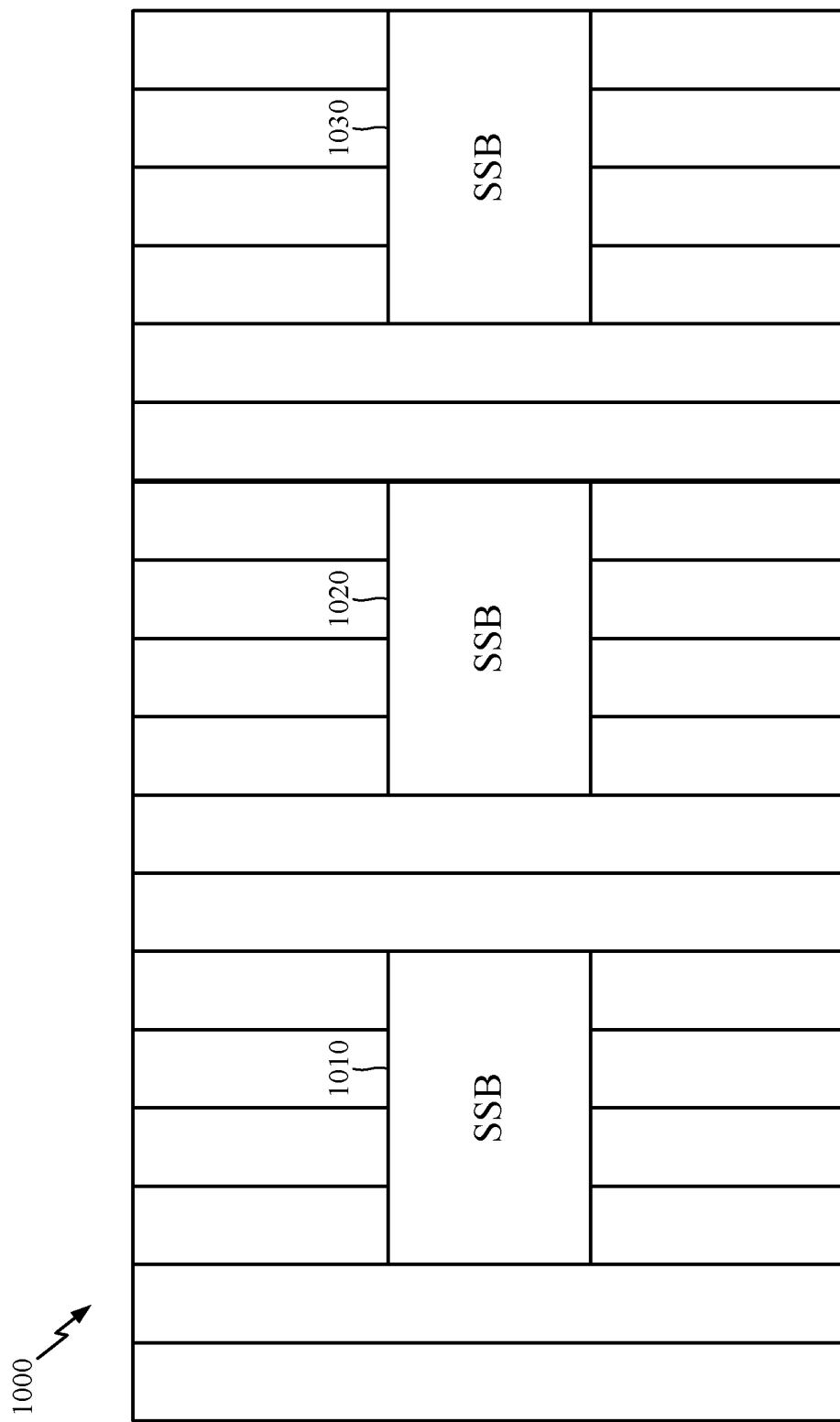
FIG. 10 illustrates an example configuration of SSB transmission opportunities with reference to frequency and time resources, in accordance with certain aspects of the present disclosure.

FIG. 10 illustrates an example configuration 1000 of SSB transmission opportunities with reference to frequency and time resources (e.g., symbols). For simplicity, FIG. 10 illustrates three SSB transmission opportunities, but the number of SSB transmission opportunities within a SS burst set may be more, such as L=64 SS blocks in a SS burst set for operation in over 6 GHz frequency bands (for carrier frequencies below 3 GHz, L may be 4, and for carrier frequencies between 3 and 6 GHz, L may be 8). In some instances, there may be predefined locations within a measurement window that are allocated for SSB transmissions. For example, resources corresponding to SSB transmission opportunities 1010, 1020, and 1030 may be allocated to transmitting SSBs, and a base station may choose to transmit in all, none, or any combination of SSB transmission opportunities 1010, 1020, or 1030.

The base station 110 may choose to transmit SSBs in SSB transmission opportunities 1010 and 1030 while refraining from transmitting in SSB transmission opportunity 1020. In this scenario, the base station 110 transmits SSBs in SSB transmission opportunities 1010 and 1030 in a manner that is not "logically consecutive," that is, there may be intervening SSB transmission opportunities (e.g., corresponding to SSB transmission opportunity 1020) between SSB transmission opportunities (1010 and 1030) in which the base station 110 does not transmit an SSB. Alternatively, the base station 110 may instead transmit SSBs in SSB transmission opportunities 1010 and 1020, in which case, the transmitted SSBs are considered logically consecutive.

As described above, for initial access to a cell, the UE may obtain system information. The system information, in some cases, may include a minimum system information (MSI) as well as other system information (OSI). Using the MSI, the UE is able to perform a random access channel (RACH) procedure with the cell. In some cases, MSI includes information carried by the PBCH (similar to the master information block (MIB) in LTE) as well as the remaining minimum system information (RMSI). The information carried by the PBCH (similar to MIB) is information that is used by the UE to acquire other information from the cell (BS). The RMSI includes information related to the UE's access to the cell (BS) as well as radio resource configuration common for all UEs in the cell. The RMSI may be interchangeably referred to as system information block 1 (SIB1), the RMSI CORESET may be interchangeably referred to as Type0-physical downlink control channel (PDCCH) common search space CORESET (i.e., CORESET configuration for Type0-physical downlink control channel (PDCCH) common search space), the OSI CORESET may be interchangeably referred to as Type0a-physical downlink control channel (PDCCH) common search space CORESET. The RMSI, as described above, is carried by a physical downlink shared channel (PDSCH). UEs are scheduled to communicate using resources of the PDSCH based on information sent in the PDCCH. The PDSCH may also carry the OSI.

The PDCCH resources, that schedule the RMSI, may be transmitted by a BS in a control resource set (CORESET) within an RMSI PDCCH monitoring window associated with the SSB. In other words, the PDCCH is mapped into the CORESET. The RMSI PDCCH monitoring window has an offset, a duration (e.g., length), and a periodicity.

A CORESET may be defined with respect to the frequency domain and the time domain. In the frequency domain, the CORESET is defined by the number of resource blocks (PRBs) (e.g., 24 PRBs, 48 PRBs), which may be referred to as the CORESET bandwidth (e.g., multiple of 6 PRBs). In some cases, the PRBs may be contiguous or non-contiguous. In the time domain, the CORESET is defined by the number of OFDM symbols. A symbol refers to a time resource. For example, the downlink control region in the time slot may have up to 3 OFDM symbols. In some embodiments, the CORESET may be a one-symbol CORESET, a two-symbol CORESET, or a three-symbol CORESET.

In some cases, the RMSI CORESET is a CORESET into which the PDCCH resources, for scheduling the PDSCH that carries RMSI, are mapped. In some cases, the RMSI CORESET configuration may be signaled in the PBCH, which is carried by a SSB. The RMSI CORESET configuration may include information relating to the RMSI CORESET bandwidth (BW) (e.g., the number of RMSI CORESET PRBs in the RMSI CORESET may be referred to as the RMSI CORESET bandwidth (BW)), the RMSI frequency offset value, and the OFDM symbols. In some cases, the OSI CORESET is a CORESET into which the PDCCH resources, for scheduling the PDSCH that carries OSI, are mapped.

Certain embodiments described herein are directed to enabling a wireless communications device, such as a UE, to determine the location of the RMSI CORESET and the OSI CORESET in the frequency and time domains. By receiving the RMSI CORESET, the UE is able to receive the PDCCH (Type0-PDCCH) in the RMSI (Type0-PDCCH common search space) CORESET, based on which the UE is able to receive and decode the PDSCH that carries RMSI. Also, the UE may determine the location of the OSI CORESET in the frequency and time domains based on the location of the RMSI CORESET in the frequency and time domains.

Note that the locations of the RMSI CORESET in the frequency and time domains may be interchangeably referred to herein as the frequency location and time location of the RMSI CORESET, respectively. Also, the locations of the OSI CORESET in the frequency and time domains may be interchangeably referred to herein as the frequency location and time location of the OSI CORESET, respectively.

Example RMSI Offset Design

In some embodiments, determining the location of the RMSI CORESET in the frequency and time domains may be based on the location of the SSB transmission in the frequency and time domains.

Figure 11:
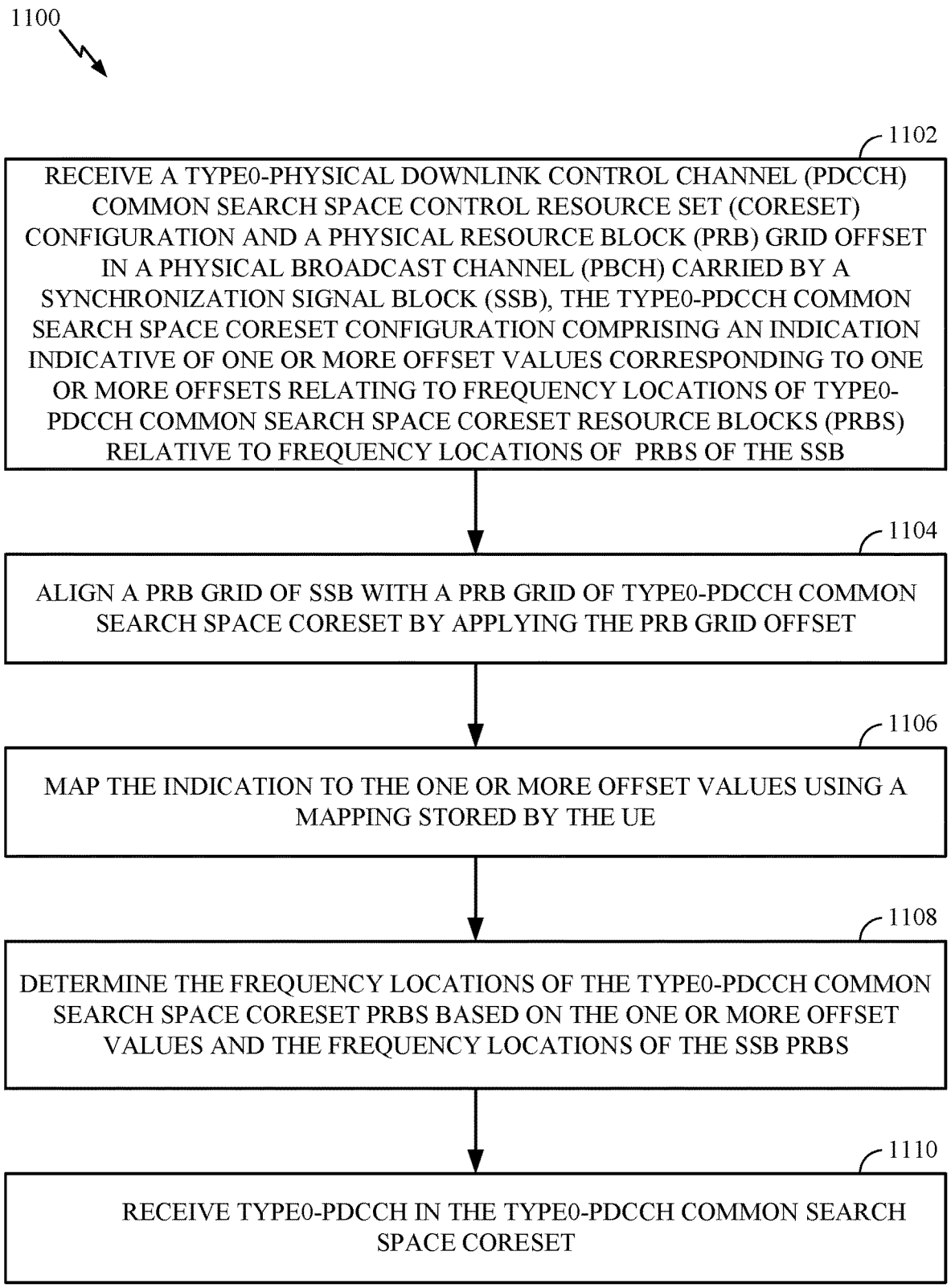
FIG. 11 illustrates example wireless communications operations for use by a user equipment (UE), in accordance with certain aspects of the present disclosure.

FIG. 11 is a flow diagram illustrating example operations 1100 for wireless communications. Operations 1100 may be performed, for example, by a UE (e.g., UE 120), for determining the location of the RMSI CORESET in the frequency domain. Operations 1100 begin at, 1102, by receiving a Type0-physical downlink control channel (PDCCH) common search space control resource set (CORESET) configuration and a physical resource block (PRB) grid offset in a physical broadcast channel (PBCH) carried by a synchronization signal block (SSB), the Type0-PDCCH common search space CORESET configuration comprising an indication indicative of one or more offset values corresponding to one or more offsets relating to frequency locations of Type0-PDCCH common search space CORESET resource blocks (PRBs) relative to frequency locations of PRBs of the SSB. At 1104, operations 1100 continue by aligning a PRB grid of SSB with a PRB grid of Type0-PDCCH common search space CORESET by applying the PRB grid offset. At 1106, operations 1100 continue by mapping the indication to the one or more offset values using a mapping stored by the UE. At 1108, operations 1100 continue by determining the frequency locations of the Type0-PDCCH common search space CORESET PRBs based on the one or more offset values and the frequency locations of the SSB PRBs. At 1110, operations 1100 continue by receiving Type0-PDCCH in the Type0-PDCCH common search space CORESET.

Figure 11A:
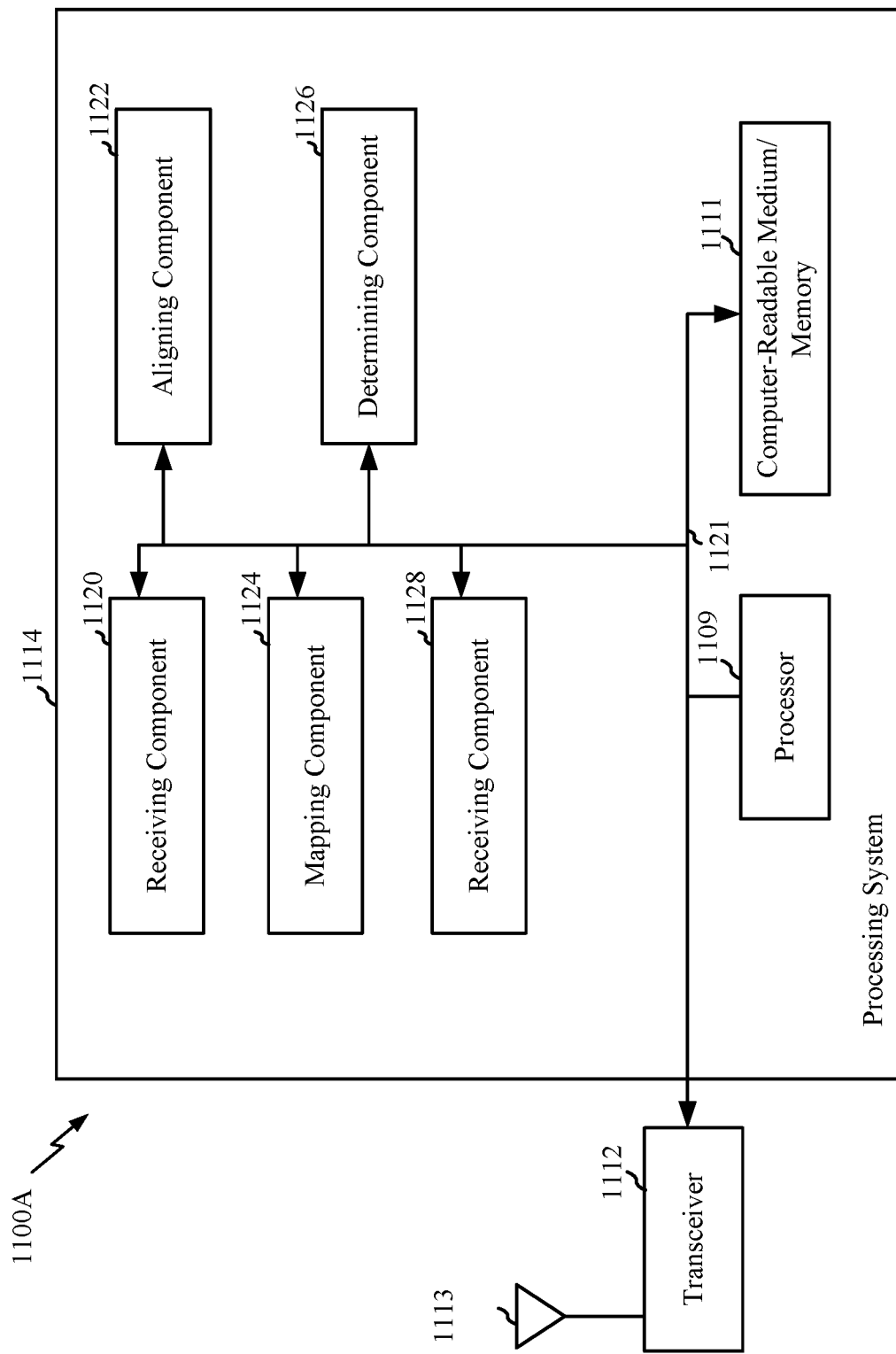
FIG. 11A illustrates a wireless communications device that may include various components configured to perform operations for the techniques disclosed herein, such as one or more of the operations illustrated in FIG. 11.

FIG. 11A illustrates a wireless communications device 1100A that may include various components (e.g., corresponding to means-plus-function components) configured to perform operations for the techniques disclosed herein, such as one or more of the operations illustrated in FIG. 11. The communications device 1100A includes a processing system 1114 coupled to a transceiver 1112. The transceiver 1112 is configured to transmit and receive signals for the communications device 1100A via an antenna 1113. The processing system 1114 may be configured to perform processing functions for the communications device 1100A, such as processing signals, etc.

The processing system 1114 includes a processor 1109 coupled to a computer-readable medium/memory 1111 via a bus 1121. In certain aspects, the computer-readable medium/memory 1111 is configured to store instructions that when executed by processor 1109, cause the processor 1109 to perform one or more of the operations illustrated in FIG. 11, or other operations for performing the various techniques discussed herein.

In certain aspects, the processing system 1114 further includes a receiving component 1120 for performing one or more of the operations illustrated at 1102 in FIG. 11. Additionally, the processing system 1114 includes an aligning component 1122 for performing one or more of the operations illustrated at 1104 in FIG. 11. Further, the processing system 1114 includes a mapping component 1124 for performing one or more of the operations illustrated at 1106 in FIG. 11. Also, the processing system 1114 includes a determining component 1126 for performing one or more of the operations illustrated at 1108 in FIG. 11. Also, the processing system 1114 includes a receiving component 1128 for performing one or more of the operations illustrated at 1110 in FIG. 11.

The receiving component 1120, the aligning component 1122, the mapping component 1124, the determining component 1126, and the receiving component 1128 may be coupled to the processor 1109 via bus 1121. In certain aspects, receiving component 1120, the aligning component 1122, the mapping component 1124, the determining component 1126, and the receiving component 1128 may be hardware circuits. In certain aspects, receiving component 1120, the aligning component 1122, the mapping component 1124, the determining component 1126, and the receiving component 1128 may be software components that are executed and run on processor 1109.

With respect to determining the location of the RMSI CORESET in the frequency domain, as described above, the UE may receive a PRB grid offset and the RMSI CORESET configuration in the PBCH, which, as described above, includes an indication of one or more RMSI frequency offset values. The UE may first align the PRB grid of the SSB with the PRB grid of the RMSI CORESET by applying the PRB grid offset. The PRB grid of the SSB refers to a set of PRBs, which are allocated for transmitting SSBs, on a larger frequency resource grid that corresponds to the entire frequency bandwidth. Similarly, a PRB grid of the RMSI CORESET refers to a set of PRBs, which are allocated for transmitting the RMSI CORESET, on a larger frequency resource grid that corresponds to the entire frequency bandwidth. The UE may then use the indication to determine the RMSI CORESET bandwidth as well as the frequency offset values, which provide an indication of the RMSI CORESET frequency locations with respect to the SSB frequency locations.

For example, in some embodiments, the RMSI CORESET may be time division multiplexed (TDM'd) with the SSB. In some embodiments, the frequency offset between RMSI CORESET and SSB (after aligning physical resource block (PRB) grid with RMSI CORESET PRB grid using PRB grid offset signaled in PBCH) may be the frequency difference from the lowest (i.e., smallest) PRB (i.e., PRB0) of SSB to the lowest (i.e., smallest) PRB (i.e., PRB0) of RMSI CORESET. As an example, when the PRB grid of the SSB with the PRB grid of the RMSI CORESET are aligned, an offset value of zero may indicate that the lowest (i.e., smallest) PRB of the SSB and the lowest (i.e., smallest) PRB of the RMSI CORESET have the same index number or frequency.

Figure 12A:
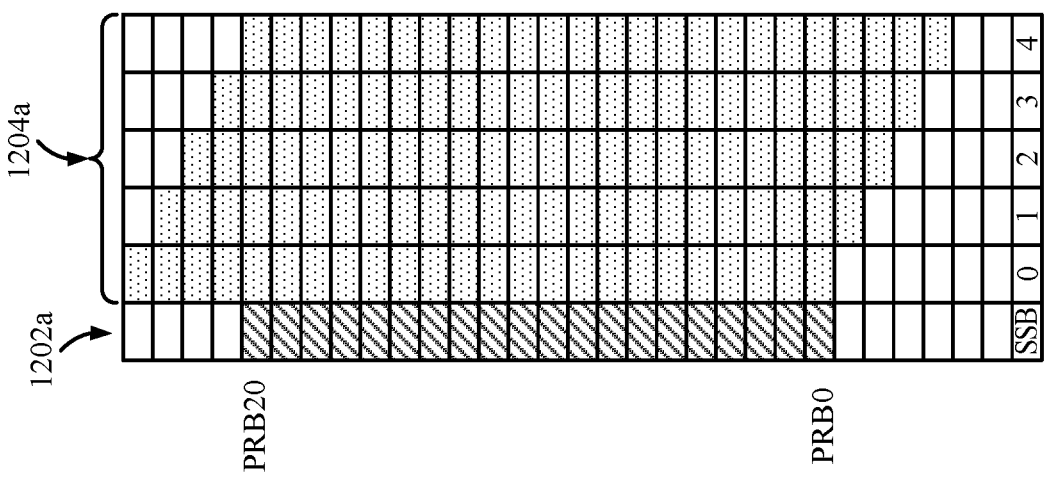
FIGS. 12A-12C illustrate physical resource block (PRB) grids each including a number of consecutive SSB PRBs and a number of consecutive remaining minimum system information (RMSI) control resource set (CORESET) PRBs, in accordance with certain aspects of the present disclosure.
Figure 12B:
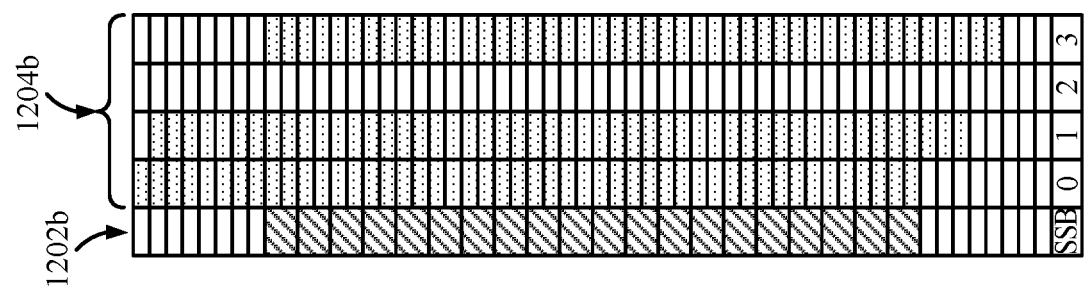
Figure 12C:
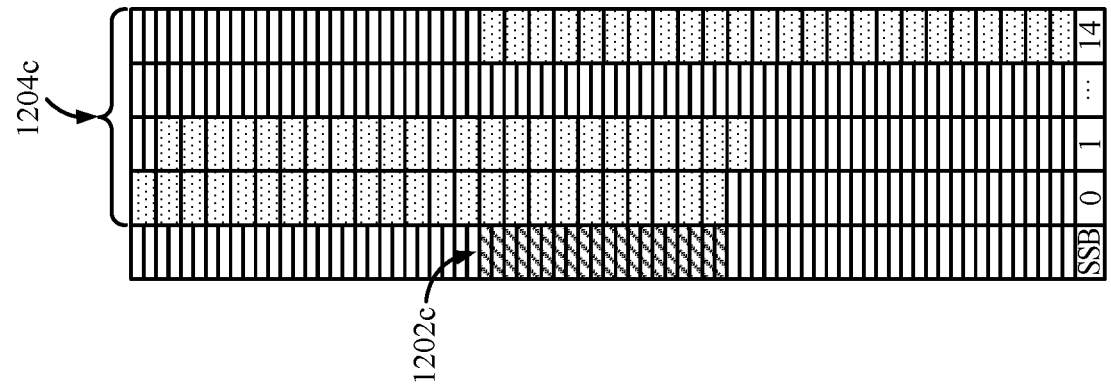

Each one of FIGS. 12A-12C illustrates a PRB grid, each including a number of consecutive SSB PRBs and a number of consecutive RMSI CORESET PRBs. As shown in each of FIGS. 12A-12C, the SSB PRBs and the RMSI CORESET PRBs are selected such that they have the maximum number of overlapping PRBs. For example, the first column, (column 1202a, 1202b, and 1202c), in each PRB grid illustrates the PRBs (shown as rows) that include SSB PRBs (e.g., shown as shaded in). Each of the remaining columns (columns 1204a, 1204b, and 1204c) in each PRB grid illustrates the PRBs that include RMSI CORESET PRBs (e.g., shown as shaded in). The columns going to the right from the first column (e.g., 1202a, 1202b, or 1202c) are ordered from 0, 1, . . . n (as shown in the last row of the grid which does not correspond to an RB, but is a label for the PRB grid), which correspond to the offsets used for determining the RMSI CORESET PRBs. The different columns are not meant to imply transmission at different times. As shown, the number of possible offsets is every offset value where the RMSI CORESET PRBs completely overlaps with the SSB PRBs.

For example, in FIG. 12A, there are 20 SSB PRBs and 24 RMSI CORESET PRBs. The 24 RMSI CORESET PRBs may be selected and transmitted in one of five different scenarios, each corresponding to a certain offset, in order to maximize the number of overlapping PRBs between the SSB PRBs and the RMSI CORESET PRBs. In the first scenario, the starting PRB (PRB0) of the SSB is the same as the starting PRB of the RMSI CORESET. In such an example, the frequency offset of the RMSI CORESET with respect to the SSB PRBs is 0 (zero). In the second scenario, the RMSI CORESET frequency starts as a PRB below the starting PRB (PRB0) of SSB. In such an example, frequency offset of the RMSI CORESET with respect to the SSB PRBs is 1. As shown in FIG. 12A, the subcarrier spacing used for the RMSI CORESET transmission is the same as the subcarrier spacing used for the SSB transmission. However, in FIGS. 12B and 12C, the subcarrier spacing (SCS) used for the RMSI CORESET transmission is different that the subcarrier spacing used for the SSB transmission. For example, in FIG. 12B, the RMSI SCS is half that of the SSB SCS. In FIG. 12C, the RMSI SCS is twice that of the SSB SCS. Accordingly, in FIG. 12B each consecutive of the RMSI CORESET is a shift of the RMSI CORESET in frequency by half the SCS of SSB. Further, in FIG. 12C each consecutive of the RMSI CORESET is a shift of the RMSI CORESET in frequency by twice the SCS of SSB. Note that in the embodiments herein, the subcarrier spacing of the RMSI (i.e., Type0-PDCCH common search space) CORESET is defined by the subcarrier spacing of the PDCCH (e.g., Type0-PDCCH). In other words, the subcarrier spacing of Type0-PDCCH common search space CORESET may be the same as the subcarrier spacing of Type0-PDCCH.

In some embodiments, the frequency offset is in a step of an integer multiple of PRB(s) with respect to RMSI CORESET subcarrier spacing (SCS). In other words, an offset value of a frequency offset is in multiples of an offset step and is based on at least an offset step size and a subcarrier spacing (SCS) of the RMSI CORESET. In some embodiments, an offset value of a frequency offset also depends on the RMSI CORESET bandwidth. In some embodiments, the offset step size depends on the RMSI CORESET bandwidth or the SSB SCS or the RMSI SCS or any combination thereof. An offset step size may be 1 PRB or higher (e.g., 2 PRBs, 6 PRBs, 8 PRBs, etc.).

In order for a UE (e.g., 120), that is receiving the RMSI CORESET, to be able to determine the location of the RMSI CORESET frequency resources, in some embodiments, the BS (e.g., 110) may transmit to the UE an indication of the offset values corresponding to the offset between the RMSI CORESET PRBs and the SSB PRBs. This indication may be carried by the RMSI CORESET configuration in the PBCH, which is carried by a SSB. In such embodiments, knowing the RMSI CORESET SCS, the UE may then use a mapping (e.g., such as a hash function, hash map or any other type of mapping) to map the information contained in the indication to a certain RMSI CORESET BW and offset values. Next, the UE may use the location of the SSB's PRBs (which is known to the UE) and apply the offset values received to determine the location of the RMSI CORESET PRBs.

However, as discussed, there may be a large number of possible frequency offset values for the RMSI CORESET depending on the RMSI SCS. FIG. 13 illustrates an example table 1300 showing the possible number of frequency offset values that the BS may indicate to the UE in the indication in various scenarios (depending on the RSMI CORE SET SCS and RMSI CORESET BW). As shown, depending on the RMSI CORESET SCS, there may be a large number of possible frequency offset values for the BS to indicate to the UE. For example, where the RMSI CORESET BW is 24, the SSB BW is 20, and the RMSI CORESET SCS=SSB SCS, then there are 5 possible offset values for the RMSI CORESET. Further, where the RMSI CORESET BW is 48, the SSB BW is 20, and the RMSI CORESET SCS=SSB SCS, there are 29 possible offset values for the RMSI CORESET. In such cases, if the mapping used by the UE to determine the location of the RMSI CORESET PRBs is based on the offset values shown in table 1300, the BS may accordingly need to use a large number of bits for transmitting an indication to the UE that indicates the offset values and RMSI CORESET BW (e.g., 6-bits to represent the 5+29=34 possible combinations for RMSI CORESET SCS=SSB SCS). However, transmitting a large number of bits in the indication may be suboptimal. Furthermore, for some combinations, some frequency offsets might be excluded from the configuration to further reduce the configuration signaling overhead.

Accordingly, in some embodiments, the UE may be configured with a mapping that enables the BS to transmit the indication to the UE in a more efficient and less resource-consuming manner. More specifically, the mapping allows for a fewer number of bits to be sent to the UE for indicating the offset values in the indication.

Figure 14:
FIG. 14 illustrates an example table showing a fewer possible number of frequency offset values that a base station (BS) may indicate to a UE in the indication in various scenarios, in accordance with certain aspects of the present disclosure.

FIG. 14 illustrates an example table 1400 showing a fewer possible number of frequency offset values that the BS may indicate to the UE in the indication in various scenarios (depending on the RSMI CORESET SCS and RMSI CORESET BW). Accordingly, mapping based on the configuration and offset values shown in table 1400 allows for a fewer number of bits to be transmitted by the BS in an indication to the UE.

As shown, the table provides different RMSI frequency offset values depending on the SCS of the RMSI CORESET and the SCS of the SSB. However, in comparison with table 1300 of FIG. 13, the offset steps of table 1400 are larger than the offset steps of table 1300. For example, where RMSI SCS=SSB SCS and the RMSI CORESET bandwidth is 24 PRBs, as shown in FIG. 12A, the offset step may be configured as 2. Accordingly, the offset values may be 0, 2, and 4 (only 3 offset values) in PRBs instead of 0, 1, 2, 3, and 4, as shown in table 1300. In another example, where RMSI SCS=SSB SCS and the RMSI CORESET bandwidth is 48, the offset step may be 6, as shown. Therefore, the offset values may be 0, 6, 12, 18, 24 (only 5 offset values), instead of 0-28 (29 offset values), as shown in table 1300. Accordingly, as described above, configuring the UE and the BS with a mapping based on the configuration and offset values shown in table 1400 enables the transmission of fewer bits to the UE (in the indication carried by the RMSI CORESET configuration) while still allowing the UE to determine the offset values. For example, if the mapping used by the UE to determine the location of the RMSI CORESET PRBs is based on the offset values shown in table 1400, the BS may accordingly need to use a smaller number of bits for transmitting an indication to the UE that indicates the offset values and RMSI CORESET BW (e.g., 3-bits to represent the 3+5=8 possible combinations for RMSI CORESET SCS=SSB SCS). These fewer number of bits may be what is included in the RMSI CORESET configuration to indicate the RMSI CORESET BW and offset value for the RMSI CORESET. As discussed, the UE may include a table, hash function, etc., that maps the bits received in the RMSI CORESET configuration to a RMSI CORESET BW and offset value. In particular, the bits received in the RMSI CORESET configuration may not directly correspond to an offset value, meaning the bit value is not directly the offset value.

Figure 15:
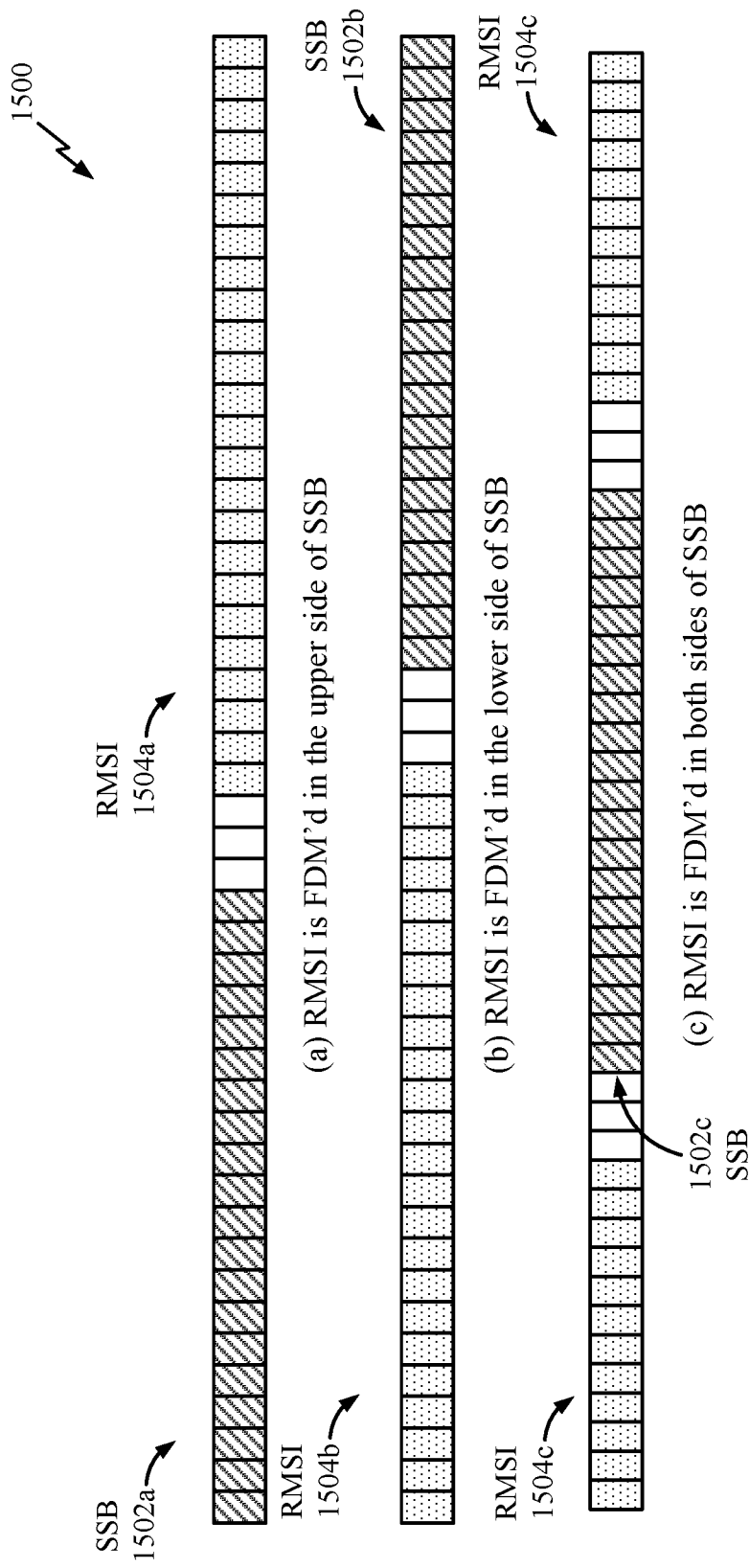
FIG. 15 shows three examples of RMSI CORESET being frequency division multiplexed (FDM'd) with the SSB, in accordance with certain aspects of the present disclosure.

In some embodiments, instead of RMSI CORESET and SSB being TDM'd, the RMSI CORESET and SSB may be frequency division multiplexed (FDM'd). FIG. 15 shows three examples of how RMSI CORESET may be FDM'd with the SSB. Each column of the rows represents a frequency location (e.g., PRB). Each of the three rows, showing an example of a different way that RMSI CORESET can be FDM'd with SSB, represents frequency resources (some of which used for RMSI CORESET and some of which user for SSB) that are received by the UE at the same time. As shown, the RMSI CORESET may be FDM'd in the upper frequencies, lower frequencies, or both sides (upper and lower frequencies) of the SSB. For example, RMSI CORESET 1504a is FMD'd in the upper side of SSB 1502a in example (a). In example (b), RMSI CORESET 1504b is FDM'd in the lower side of SSB 1502b. In example (c), RMSI CORESET 1504c is FDM'd on both sides of SSB 1502c.

When the RMSI CORESET is FDM'd with the SSB, the RMSI CORESET configuration may include an indication indicative of offset values corresponding to the offset between the RMSI CORESET PRBs and the SSB PRBs. This indication carried by the RMSI CORESET configuration in the PBCH. In such embodiments, knowing the RMSI CORESET SCS, the UE may then use a mapping (e.g., such as a hash function, hash map or any other type of mapping) to map the information contained in the indication to a certain RMSI CORESET BW and offset values. Next, the UE may use the location of the SSB PRBs resources (which is known to the UE) and apply the offset values received to determine the location of the RMSI CORESET PRBs. In some embodiments, the mapping may be based on example configuration and offset values shown in table 1600.

Figure 16:
FIG. 16 illustrates an example table showing different offset values depending on whether the RMSI subcarrier spacing (SCS) and the SSB SCS are the same or different, in accordance with certain aspects of the present disclosure.

FIG. 16 illustrates example table 1600 which shows different offset values depending on whether the RMSI SCS and the SSB SCS are the same or different. For example, where RMSI SCS=SSB SCS and the RMSI CORESET bandwidth is 24, offset values may be—(20+G), {6, 12, 18, 24}+G0. Such offset values may indicate that the SSB starts as frequency −20 PRB, followed by a guard period (G), followed by the 24 PRBs of RMSI CORESET, in units of, for example, 6 PRBs (the control channel element (CCE) for PDCCH is 6 PRBs). Similar to the TDM example, in the FDM example, table 1600 includes fewer offset values for each particular RMSI SCS and RMSI CORESET BW than are physically possible. Accordingly, fewer bits may be used to represent the RMSI CORESET BW and offset values. The UE may include a table, hash function, etc., that maps the bits received in the RMSI CORESET configuration to a RMSI CORESET BW and offset value. In particular, the bits received in the RMSI CORESET configuration may not directly correspond to an offset value, meaning the bit value is not directly the offset value.

In addition to determining the location of the RMSI CORESET in the frequency domain, the UE may determine the RMSI CORESET time location in the time domain.

Figure 17:
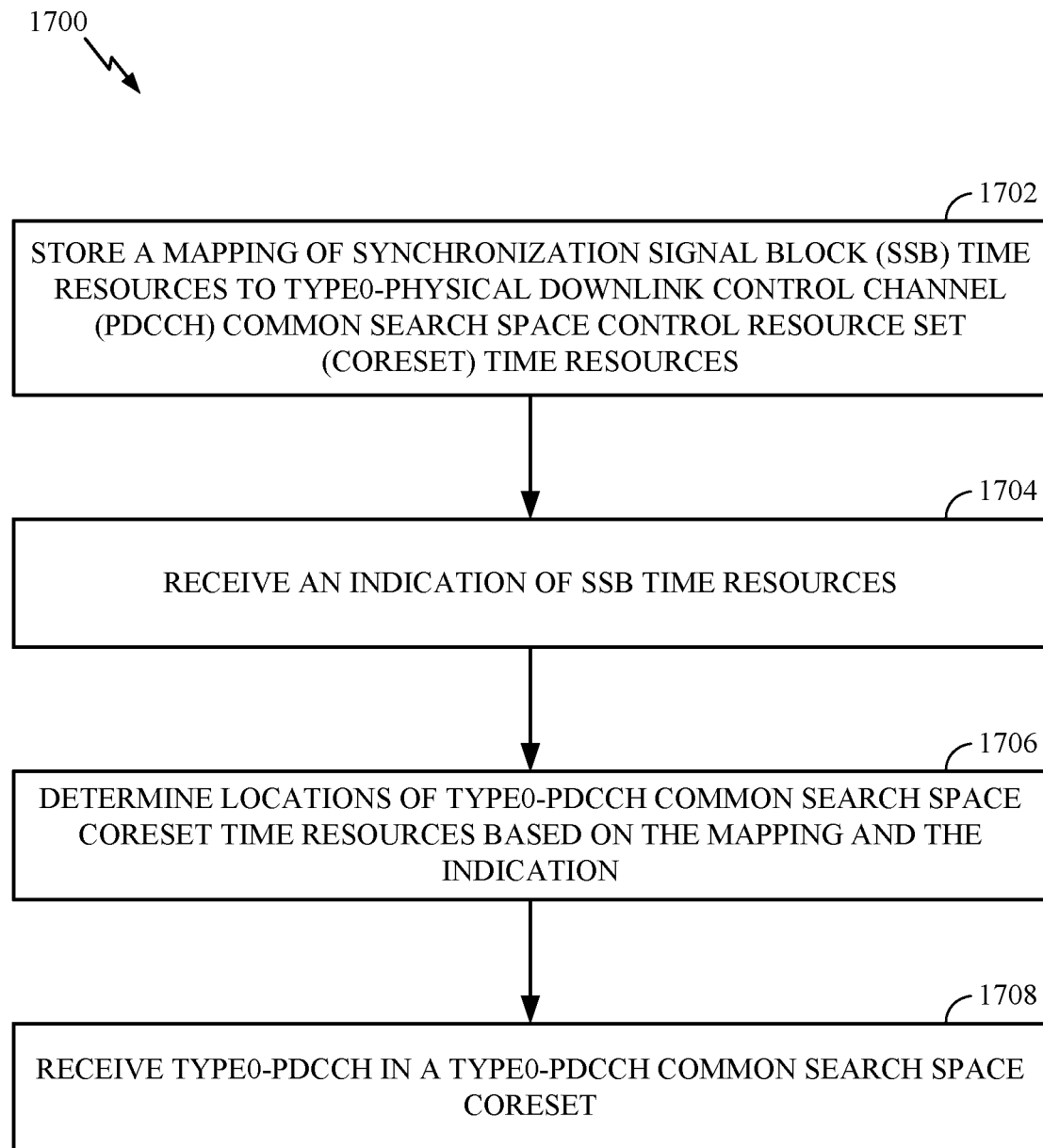
FIG. 17 illustrates example wireless communications operations for use by a user equipment (UE), in accordance with certain aspects of the present disclosure.

FIG. 17 is a flow diagram illustrating example operations 1700 for wireless communications. Operations 1700 may be performed, for example, by a UE (e.g., UE 120), for determining the location of the RMSI CORESET in the time domain. Operations 1700 begin, at 1702, by storing a mapping of synchronization signal block (SSB) time resources to Type0-physical downlink control channel (PDCCH) common search space control resource set (CORESET) time resources. At 1704, operations 1700 continue by receiving an indication of the SSB time resources. At 1706, operations 1700 continue by determining locations of RMSI CORESET time resources based on the mapping and the indication. At 1708, operations 1700 continue by receiving Type0-PDCCH in a Type0-PDCCH common search space CORESET.

Figure 17A:
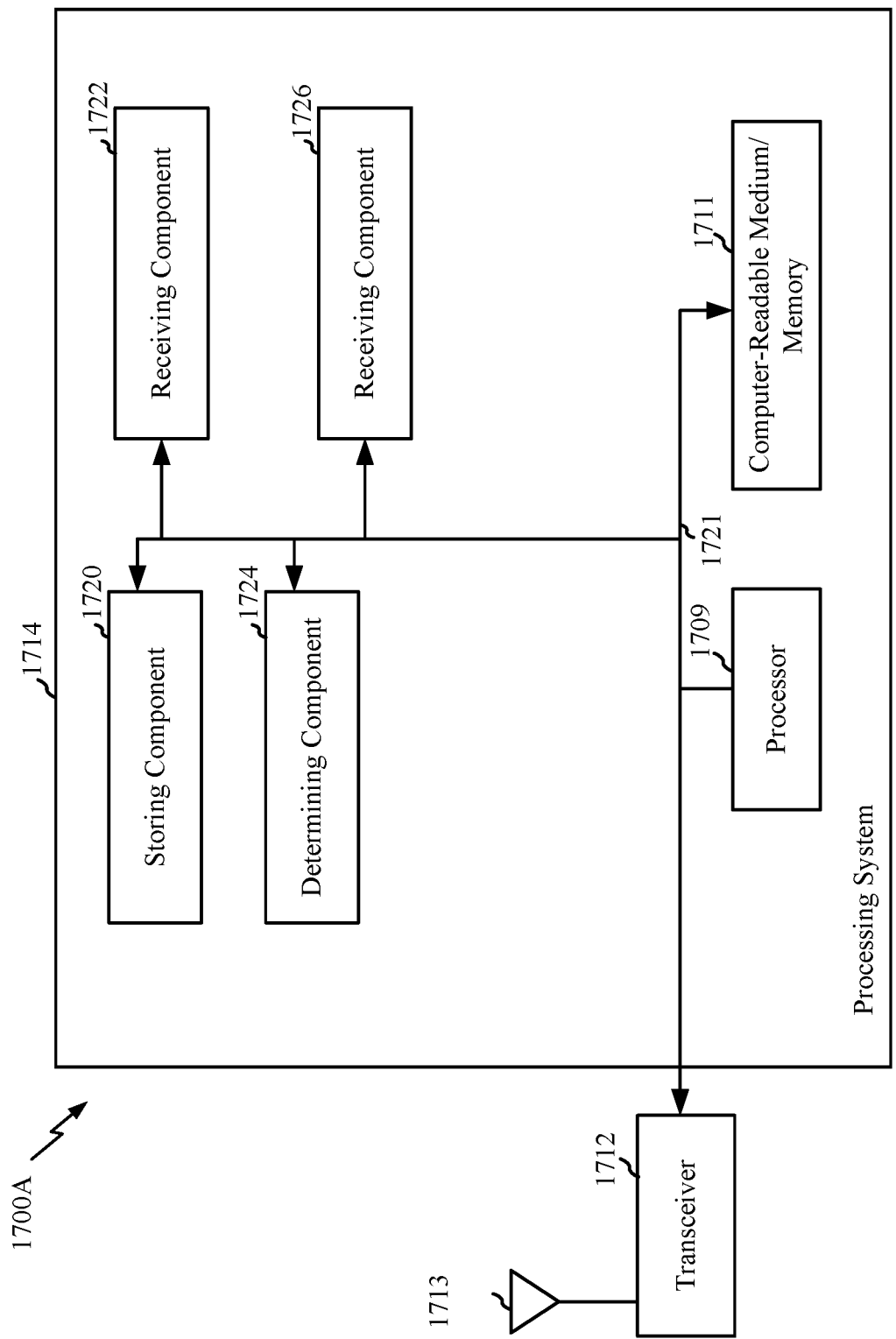
FIG. 17A illustrates a wireless communications device that may include various components configured to perform operations for the techniques disclosed herein, such as one or more of the operations illustrated in FIG. 17.

FIG. 17A illustrates a wireless communications device 1700A that may include various components (e.g., corresponding to means-plus-function components) configured to perform operations for the techniques disclosed herein, such as one or more of the operations illustrated in FIG. 17. The communications device 1700A includes a processing system 1714 coupled to a transceiver 1712. The transceiver 1712 is configured to transmit and receive signals for the communications device 1700A via an antenna 1713. The processing system 1714 may be configured to perform processing functions for the communications device 1700A, such as processing signals, etc.

The processing system 1714 includes a processor 1709 coupled to a computer-readable medium/memory 1711 via a bus 1721. In certain aspects, the computer-readable medium/memory 1711 is configured to store instructions that when executed by processor 1709, cause the processor 1709 to perform one or more of the operations illustrated in FIG. 11, or other operations for performing the various techniques discussed herein.

In certain aspects, the processing system 1714 further includes a storing component 1720 for performing one or more of the operations illustrated at 1702 in FIG. 17. Additionally, the processing system 1714 includes a receiving component 1722 for performing one or more of the operations illustrated at 1704 in FIG. 17. Further, the processing system 1714 includes a determining component 1724 for performing one or more of the operations illustrated at 1706 in FIG. 17. Also, the processing system 1714 includes a receiving component 1726 for performing one or more of the operations illustrated at 1708 in FIG. 17.

The storing component 1720, the receiving component 1722, the determining component 1724, and the receiving component 1726 may be coupled to the processor 1709 via bus 1721. In certain aspects, the storing component 1720, the receiving component 1722, the determining component 1724, and the receiving component 1726 may be hardware circuits. In certain aspects, the storing component 1720, the receiving component 1722, the determining component 1724, and the receiving component 1726 may be software components that are executed and run on processor 1709.

In some embodiments, the RMSI CORESET may be mapped into the downlink time slots. The mapping of RMSI CORESET into the downlink slots allows for flexible multiplexing of time slots with different numerologies as well as flexible uplink (UL) and downlink (DL) slot switching and UL and DL switching within a time slot. In some embodiments, there may be different options for mapping the RMSI CORESET into the DL slots. For example, in some embodiments, RMSI CORESET(s) are mapped into the downlink slots containing SSB(s) only. In some embodiments, for some SS burst set patterns, RMSI CORESET(s) are first mapped into the downlink slots containing SSB(s) and then mapped into the downlink slots without SSB(s). In some embodiments, for some SS burst set patterns, RMSI CORESET(s) are mapped to the downlink slots without SSB(s) only.

In some embodiments, the time location of the RMSI CORESET may be determined relative to SSB time location. For example, in some embodiments, there may be a one-to-one mapping or a many-to-one mapping between the SSB timing and the RMSI CORESET timing. Once the UE detects PSS/SSS and decodes PBCH, the UE could infer timing of RMSI CORESETs.

In some embodiments, the RMSI CORESET location in time may be defined relative to each SSB location. In some embodiments, the RMSI CORESET location in time may be defined such that the $1^{st}$ RMSI CORESET is offset to the $1^{st}$ SSB and the following RMSI CORESETs defined with a configured distance between RMSI CORESETs. In some embodiments, the RMSI CORESET location in time may be a fixed location for each value of RMSI configuration table. In some embodiments, RMSI PDCCH monitoring window (containing one or more RMSI CORESET(s) associated with a SSB) timing may be defined relative to the corresponding SSB timing. In one example, the start timing of the first RMSI PDCCH monitoring window associated with first SSB is defined to be relative to the timing of the first SSB timing, and the timing of other RMSI PDCCH monitoring windows associated with the other SSBs are defined to be relative to the timing of first RMSI PDCCH monitoring window. The relative timing between RMSI PDCCH monitoring window to the associated SSB can be fixed or signaled to the UE as a part of RMSI configuration. If it is signaled in the RMSI configuration, it can be jointly encoded with other information in the configuration such as RMSI CORESET configuration.

Figure 18A:
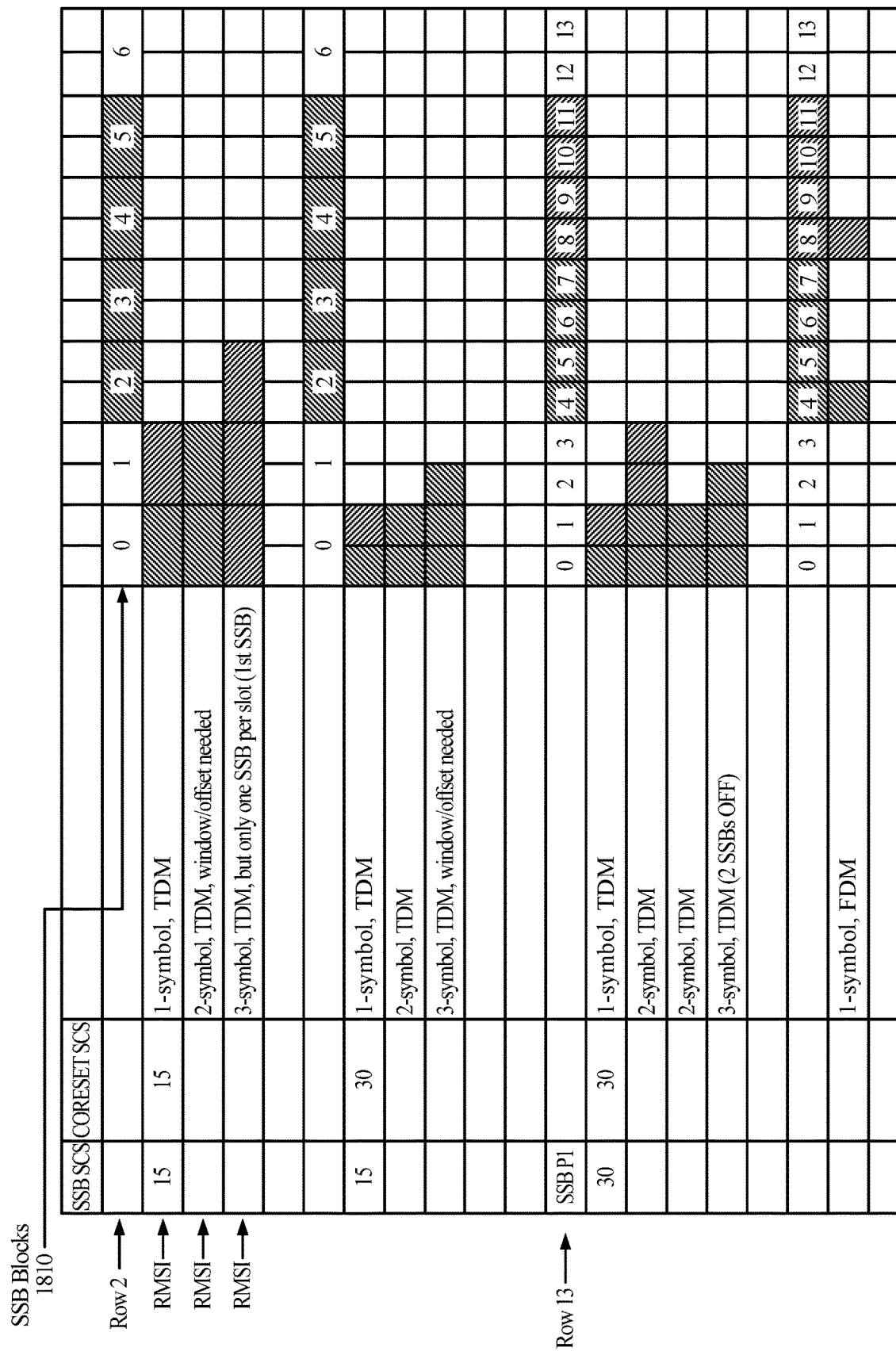
Figure 18B:
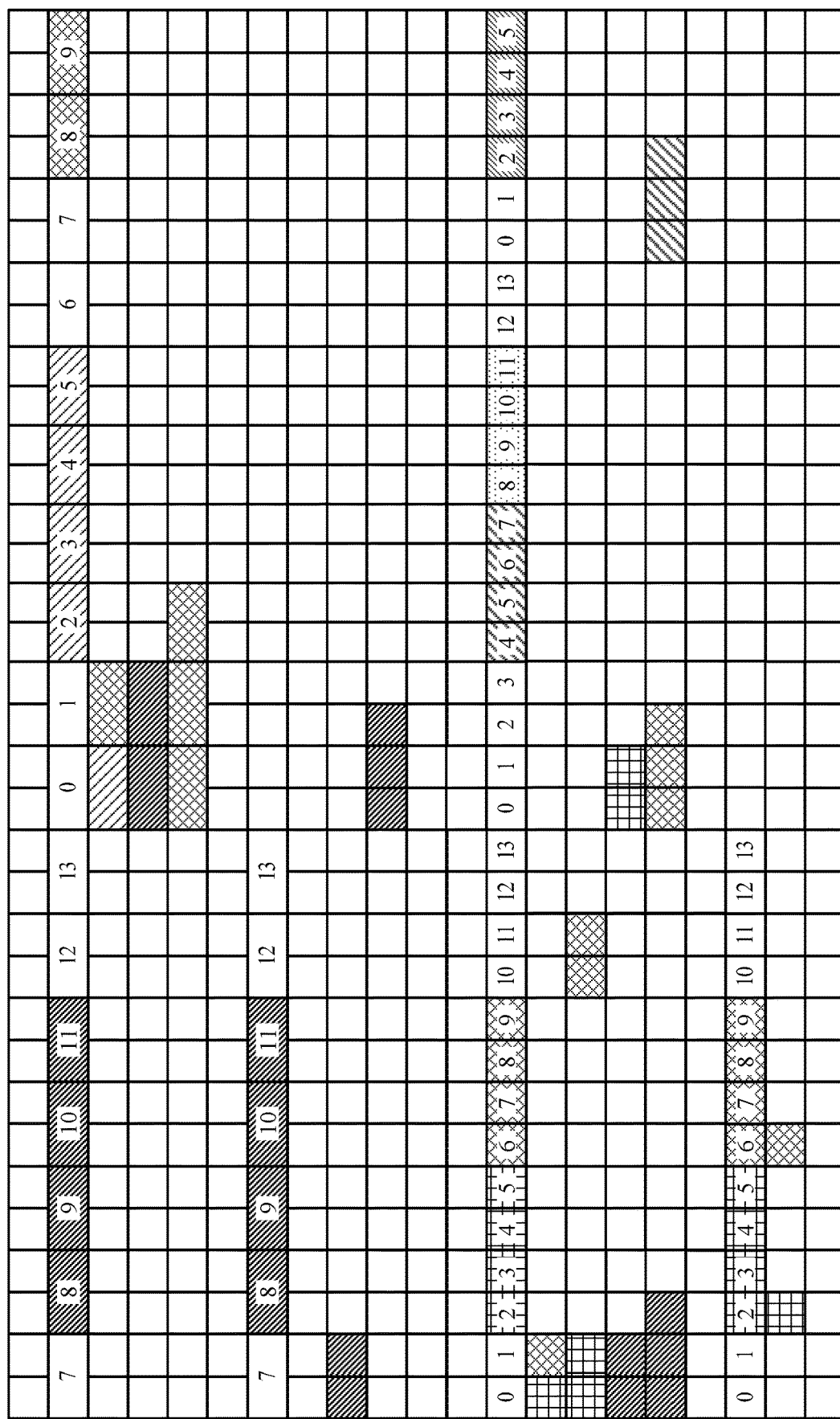
Figure 18D:
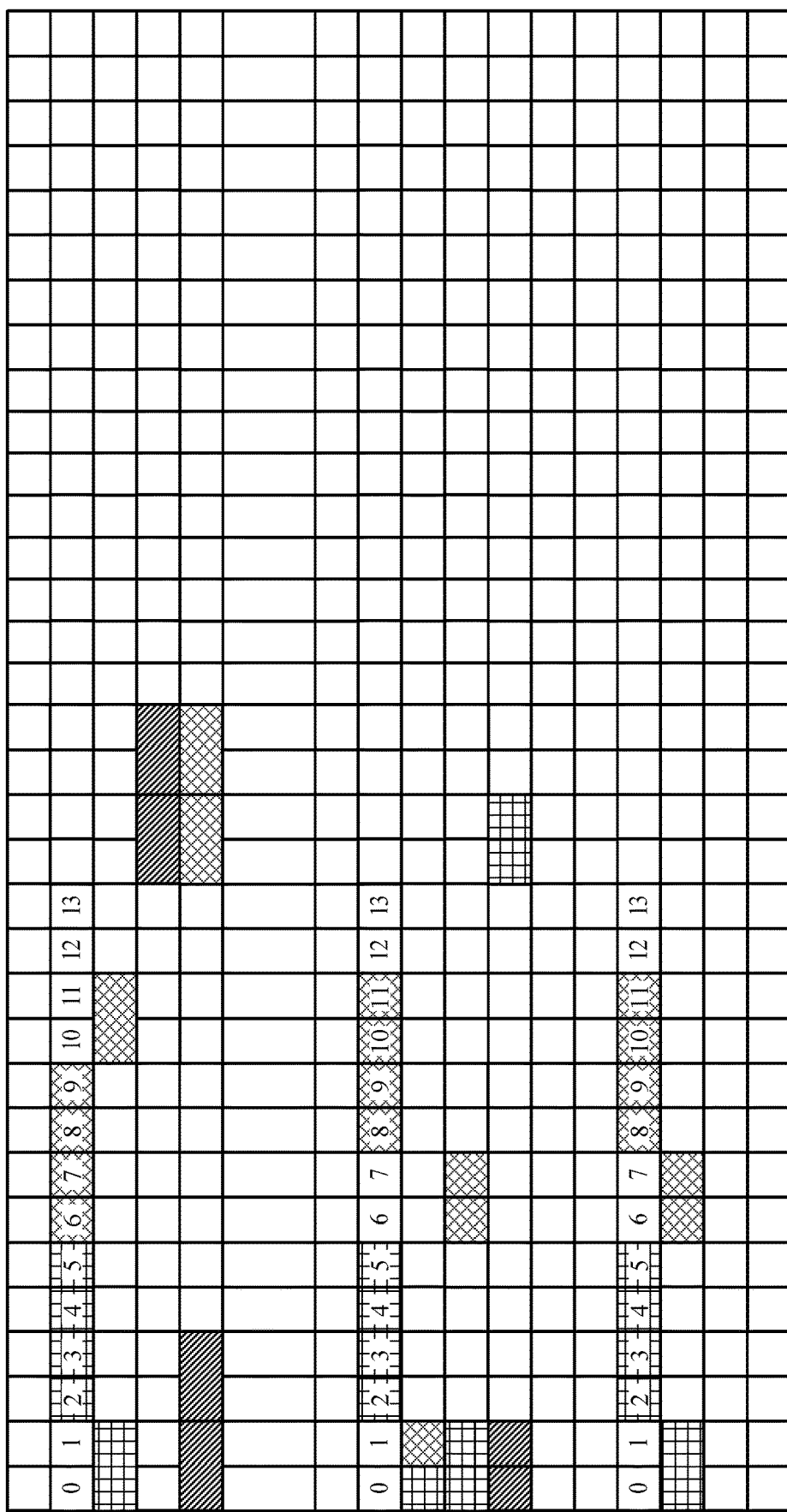

FIG. 18 illustrates how a collection of FIGS. 18A-18D may be arranged to show a complete figure including example mappings between the RMSI timing locations and the SSB timing locations for a frequency band below 6 GHz. In other words, different portions of FIG. 18 are illustrated by FIGS. 18A-18D and FIG. 18 indicates the correct arrangement of how FIGS. 18A-18D may be placed next to each other to create a complete FIG. 18.

These mappings, which may be stored by the UE, enable the UE to determine the time symbols in which the RMSI CORESET are received based on the time symbols in which the SSB is received. FIGS. 18A-18D illustrate different mappings between the RMSI timing locations and the SSB timing locations for different SSB and RMSI CORESET subcarrier spacing (SCS) combinations.

Each column of the mappings shown in FIG. 18A corresponds to a time symbol. For example, the first column corresponds to time symbol 0 and the second column corresponds to time symbol 1. Also, each row is shown as an illustration of RMSI CORESET or SSB resources received at different time symbols. As there are 14 time symbols in each time slot, the aggregate of the time resources in columns 0-13 of, for example, row 2 corresponds to one time slot (shown in FIGS. 18A and 18B). In another example where the SCSs of SSB and RMSI CORESET are 30 kHz, the aggregate of the time resources in columns 0-13 of row 13 also corresponds to a time slot. In certain aspects, the contents of the SSB and RMSI could be FDM'd together based on the frequency location of the RMSI according to the embodiments herein.

For example, in embodiments where the SCS of the SSB and the RMSI are 15 kHz the mappings between the SSB time symbols and the RMSI CORESET time symbols are shown by rows 2-5, where the second row shows the location of the SSB time symbols and rows 3-5 show the location of the RMSI CORESET time symbols in relation to the SSB time symbols. More specifically, row 3 shows the mapping between the RMSI CORESET time symbols and the SSB time symbols when the RMSI CORESET is one-symbol long. For example, the second row includes SSB time symbols 2-5 and 8-11 in the first time slot (shown in FIGS. 18A-18B) as well as SSB time symbols 2-5 and 8-9 in the next time slot (shown in FIG. 18B) (collectively shown as SSB block 1810).

Based on the location of the SSB PRBs 1810, the UE may determine the location of the RMSI CORESET slots. For example, where the SCSs of SSB and RMSI CORESET are 15 kHz and when the time duration of RMSI CORESET is one symbol long (shown in row 3 of FIG. 18A), the location of the first RMSI CORESET time symbol in the first time slot is time symbol 0 based on the first SSB transmission occupying time symbols 2-5. Similarly, the location of the second RMSI CORESET time symbol is time symbol 1, when the second transmission of the SSB in the same time slot occupies time symbols 8-11. As shown in row 4 of the table, when the RMSI CORESET is 2 symbols long, however, the RMSI CORESET in the first time slot occupies time symbols 0 and 1 etc. The different rows (3-5) are not meant to imply transmission at different times or frequencies. They are meant to show the different scenarios where RMSI CORESET may be transmitted with a variety of symbol lengths.

Figure 19A:
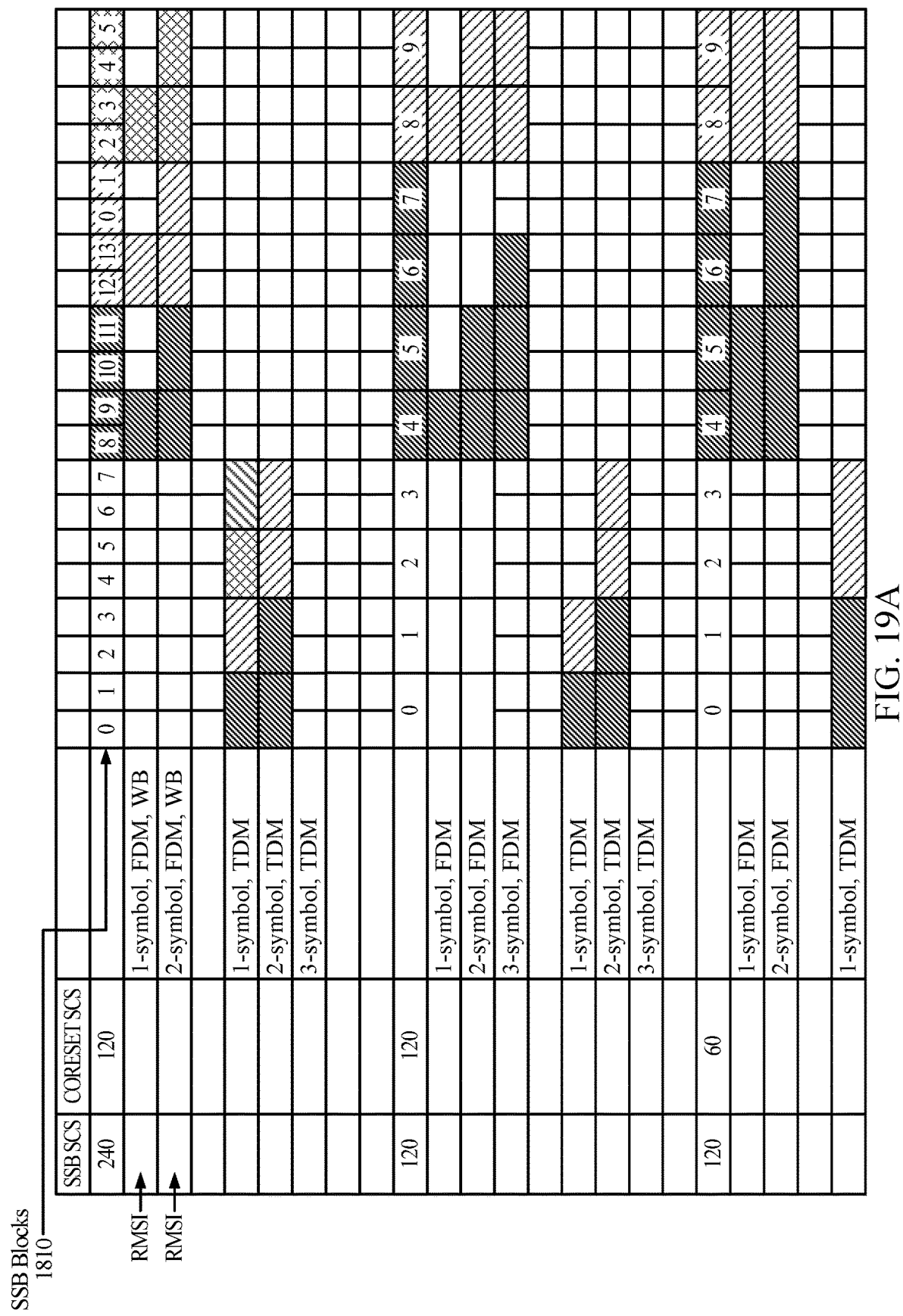
FIGS. 19A-19B illustrate example mappings between the RMSI timing locations and the SSB timing locations for a frequency band above 6 GHz, in accordance with certain aspects of the present disclosure.
Figure 19B:
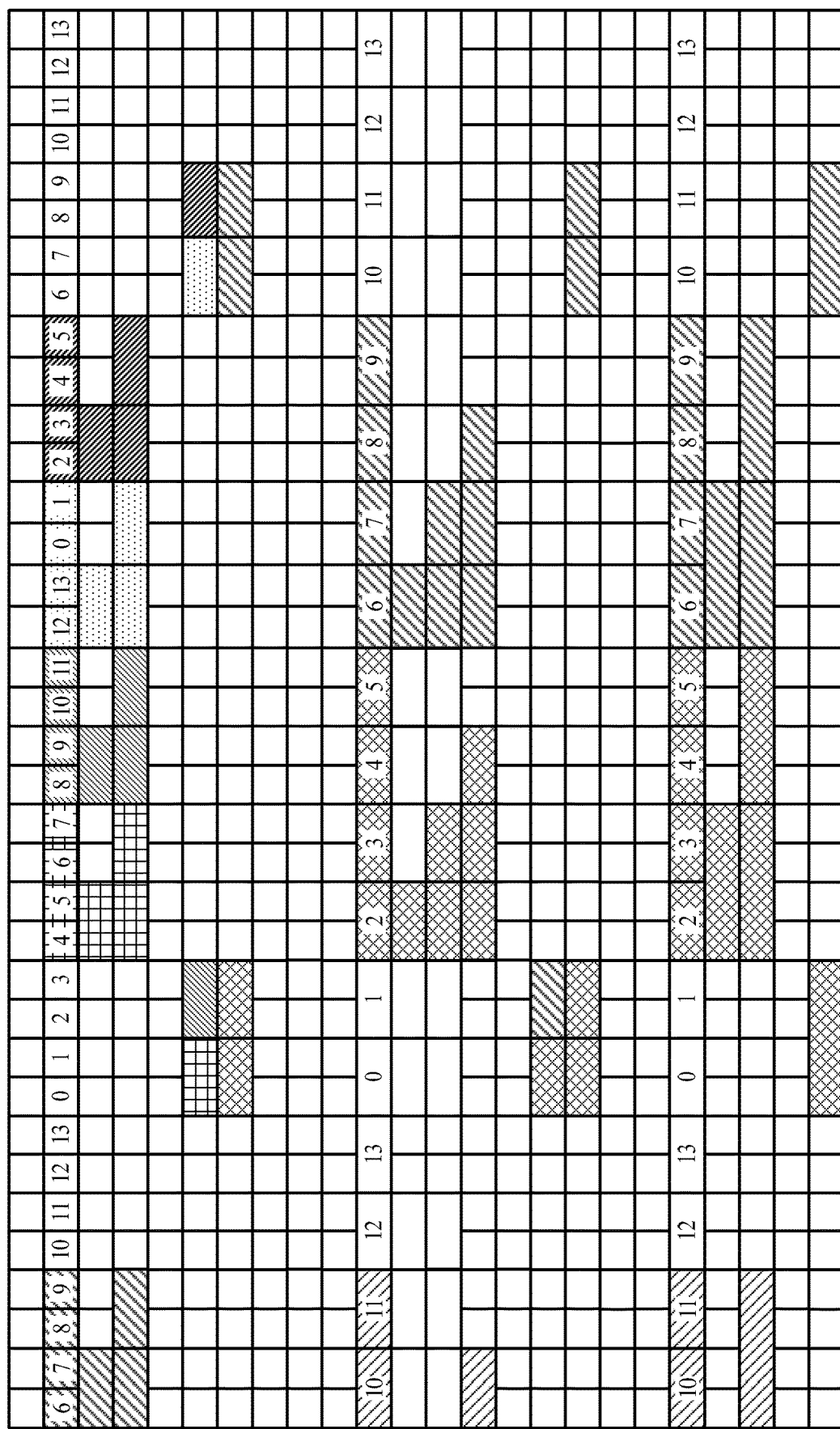

FIG. 19 illustrates how a collection of FIGS. 19A-18B may be arranged to show a complete figure including example mappings between the RMSI timing locations and the SSB timing locations for a frequency band above 6 GHz. Similar to FIG. 18, each column of the mapping of FIG. 19 corresponds to a time symbol. For example, the first column corresponds to time symbol 0 and the second column corresponds to time symbol 1. Also each row is shown as an illustration of RMSI CORESET and SSB resources received at different time symbols. However, the contents of the SSB and RMSI could be FDM'd together based on the frequency location of the RMSI according to the embodiments herein.

As an example, where the SCS of the SSB and the RMSI are both 120 kHz, the mappings between the SSB time symbols and the RMSI CORESET time symbols are shown by rows 11-14 of the table, for when the SSB resources are FDM'd together with RMSI CORESET resources, and rows 16-18 of the table, for when the SSB resources are TDM'd together with RMSI CORESET resources. For example, when the SSB resources are FDM'd together with RMSI CORESET resources, row 11 shows the location of the SSB time symbols and rows 12-14 show the location of the RMSI CORESET time symbols in relation to the SSB time slots. The different rows (12-14) are not meant to imply transmission at different times or frequencies. They are meant to show the different scenarios where RMSI CORESET may be transmitted with a variety of symbol lengths.

Example OSI CORESET Offset Design

Parameters, such as frequency location, bandwidth, and numerology, for broadcast OSI CORESET are the same as those for the corresponding RMSI CORESET. In certain aspects, such parameters are identical for RMSI CORESETs configured by PBCH in all SSB or PBCH blocks which define a cell from the perspective of the UE. It's important to note that the OSI CORESET periodicity might, however, be longer than RMSI CORESET periodicity.

Accordingly, in some embodiments, the UE may determine the location of the OSI CORESET in the frequency and time domains based on the location of the RMSI CORESET in the frequency and time domains. In such embodiments, the timing offset between OSI CORESET and RMSI CORESET is signaled to the UE (e.g., implicitly or explicitly). An implicit signaling takes place when the UE is able to infer the locations of both the RMSI CORESET and the OSI CORESET time resources based on the location of the SBB time resources. An explicit signaling takes place when the UE is able to infer the locations of the OSI CORESET time resources based on the location of the RMSI CORESET time resources. Therefore, once the UE acquires RMSI PDCCH successfully, as described above, it may infer the corresponding OSI CORESET timing for acquiring OSI PDCCH. In some embodiments, the timing of OSI CORESET may be defined relative to the SSB timing. This timing may be signaled in RMSI to UE or may be fixed.

The network may configure CORESET configuration for OSI in RMSI to UE. If no such configuration is signaled to the UE, the UE uses the CORESET configuration for RMSI signaled in PBCH.

Figure 20:
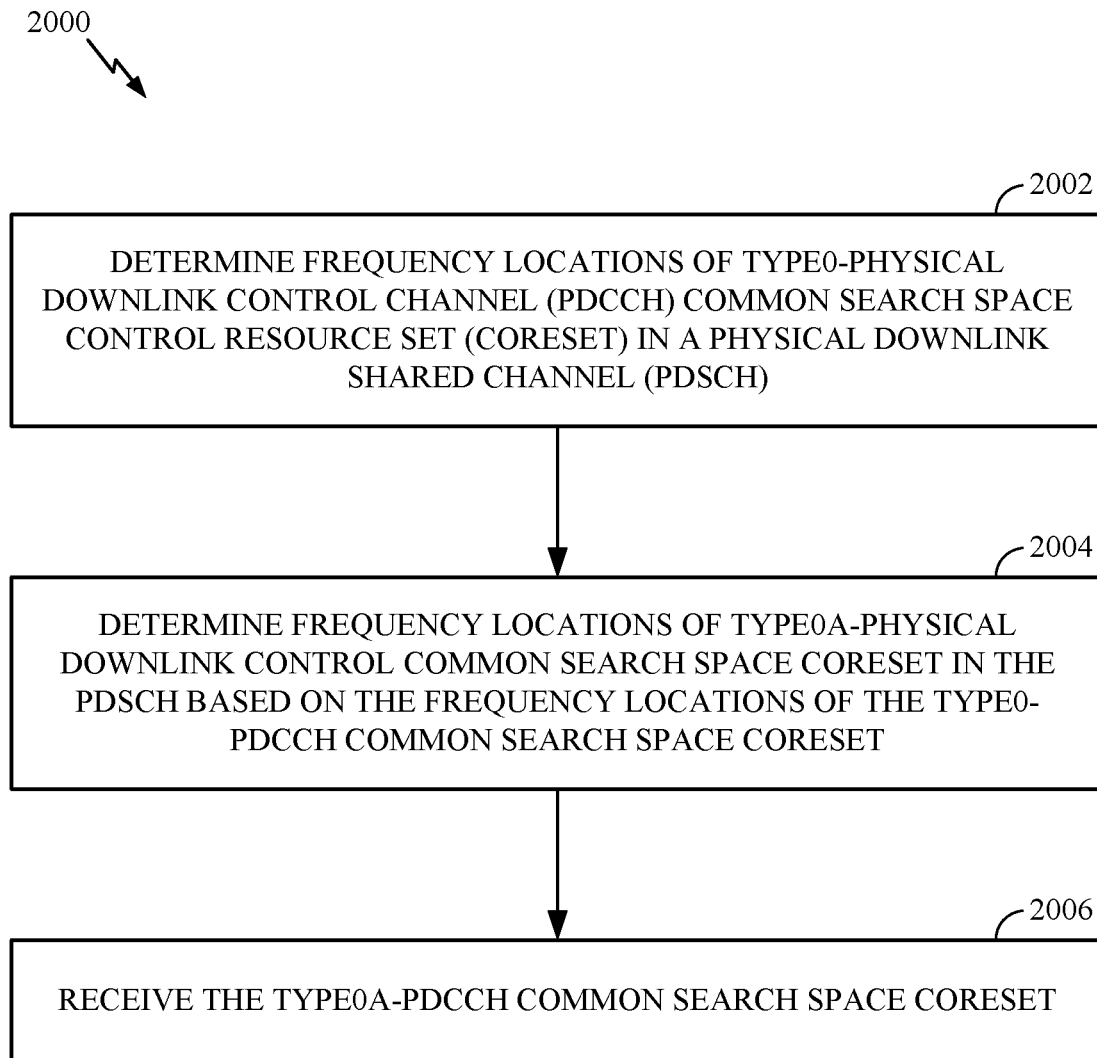
FIG. 20 illustrates example wireless communications operations for use by a user equipment (UE), in accordance with certain aspects of the present disclosure.

FIG. 20 is a flow diagram illustrating example operations 2000 for wireless communications. Operations 2000 may be performed, for example, by a UE (e.g., UE 120), for determining the location of the OSI CORESET frequency resources. Operations 2000 begin, at 2002, by determining frequency locations of Type0-physical downlink control channel (PDCCH) common search space control resource set (CORESET) in a physical downlink shared channel (PDSCH). At 2004, operations 2000 continue by determining frequency locations of Type0a-physical downlink control common search space CORESET in the PDSCH based on the frequency locations of the Type0-PDCCH common search space CORESET. At 2006, operations 2000 continue by receiving the Type0a-PDCCH common search space CORESET.

Figure 20A:
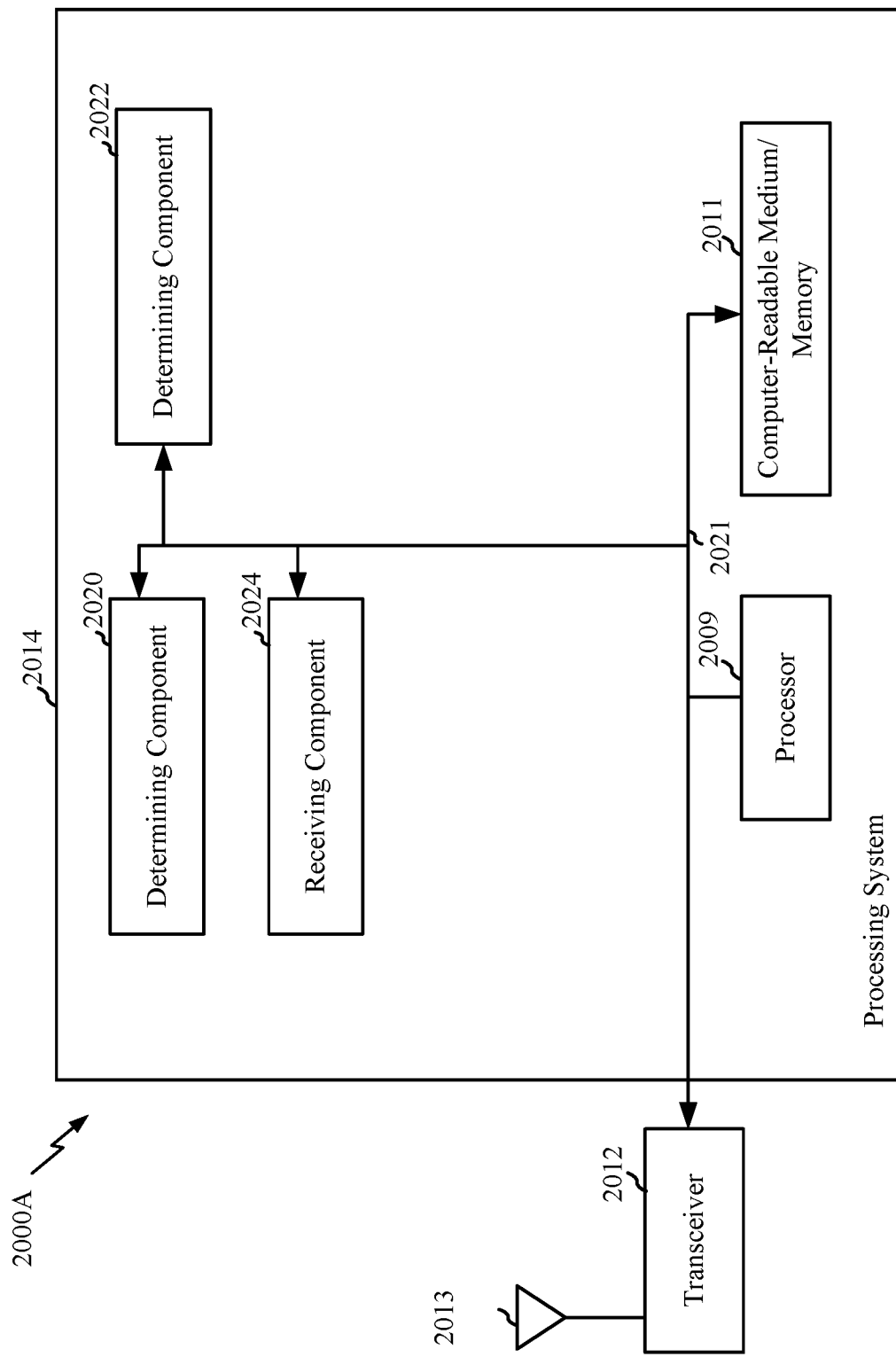
FIG. 20A illustrates a wireless communications device that may include various components configured to perform operations for the techniques disclosed herein, such as one or more of the operations illustrated in FIG. 20.

FIG. 20A illustrates a wireless communications device 2000A that may include various components (e.g., corresponding to means-plus-function components) configured to perform operations for the techniques disclosed herein, such as one or more of the operations illustrated in FIG. 20. The communications device 2000A includes a processing system 2014 coupled to a transceiver 2012. The transceiver 2012 is configured to transmit and receive signals for the communications device 2000A via an antenna 2013. The processing system 2014 may be configured to perform processing functions for the communications device 2000A, such as processing signals, etc.

The processing system 2014 includes a processor 2009 coupled to a computer-readable medium/memory 2011 via a bus 2021. In certain aspects, the computer-readable medium/memory 2011 is configured to store instructions that when executed by processor 2009, cause the processor 2009 to perform one or more of the operations illustrated in FIG. 20, or other operations for performing the various techniques discussed herein.

In certain aspects, the processing system 2014 further includes a determining component 2020 for performing one or more of the operations illustrated at 2002 in FIG. 20. Additionally, the processing system 2014 includes a determining component 2022 for performing one or more of the operations illustrated at 2004 in FIG. 20. Further, the processing system 2014 includes a receiving component 2024 for performing one or more of the operations illustrated at 2006 in FIG. 20.

The determining component 2020, the determining component 2022, and the receiving component 2024 may be coupled to the processor 2009 via bus 2021. In certain aspects, the determining component 2020, the determining component 2022, and the receiving component 2024 may be hardware circuits. In certain aspects, the determining component 2020, the determining component 2022, and the receiving component 2024 may be software components that are executed and run on processor 2009.

Figure 21:
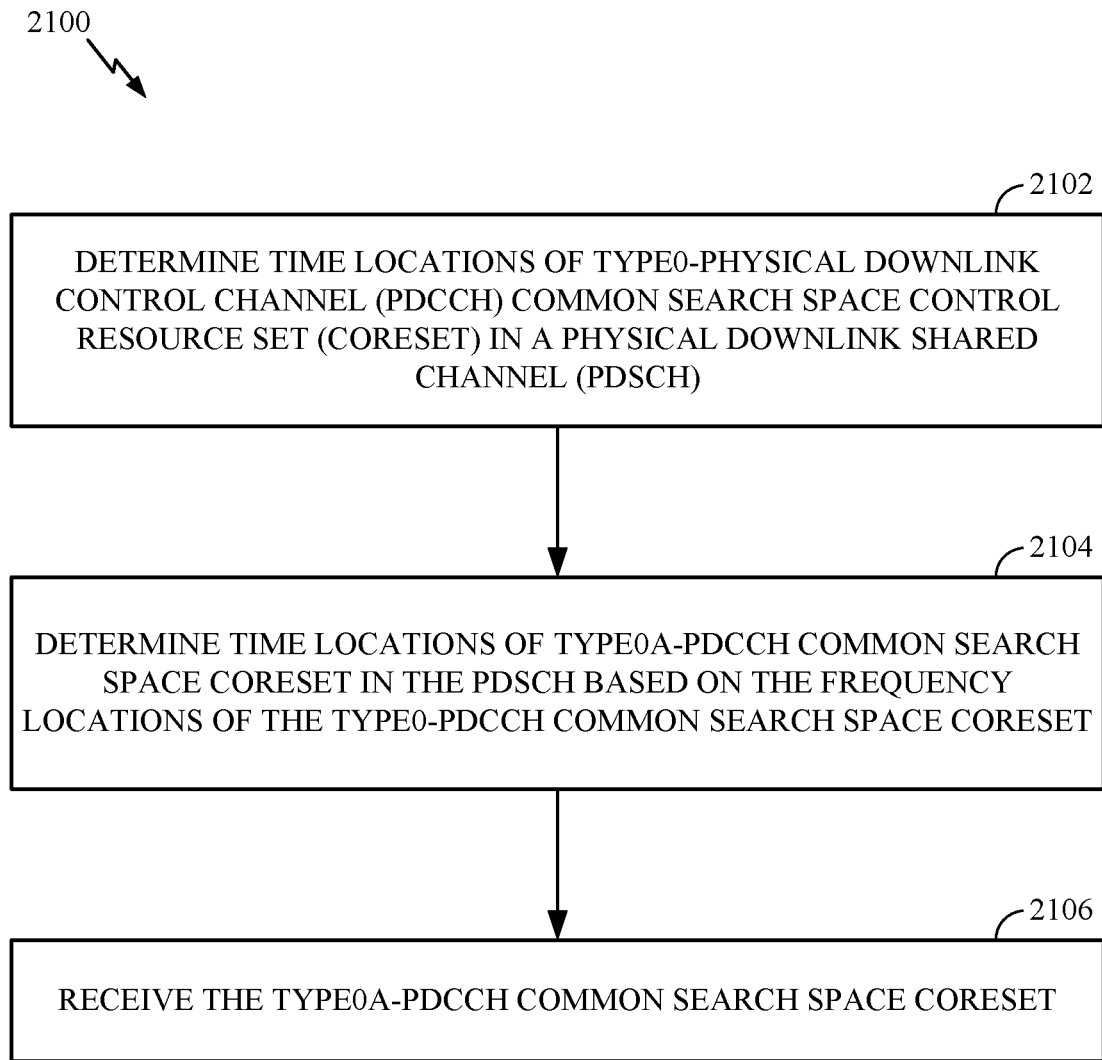
FIG. 21 illustrates example wireless communications operations for use by a user equipment (UE), in accordance with certain aspects of the present disclosure.

FIG. 21 is a flow diagram illustrating example operations 2100 for wireless communications. Operations 2000 may be performed, for example, by a UE (e.g., UE 120), for determining the location of the OSI CORESET time resources. Operations 2000 begin, at 2002, by determining time locations of remaining minimum system information (RMSI) control resource set (CORESET) in a physical downlink shared channel (PDSCH). At 2004, operations 2000 continue by determining time locations of other system information (OSI) CORESET in the PDSCH based on the time and frequency locations of RMSI CORESET. At 2006, operations 2000 continue by receiving the OSI.

Figure 21A:
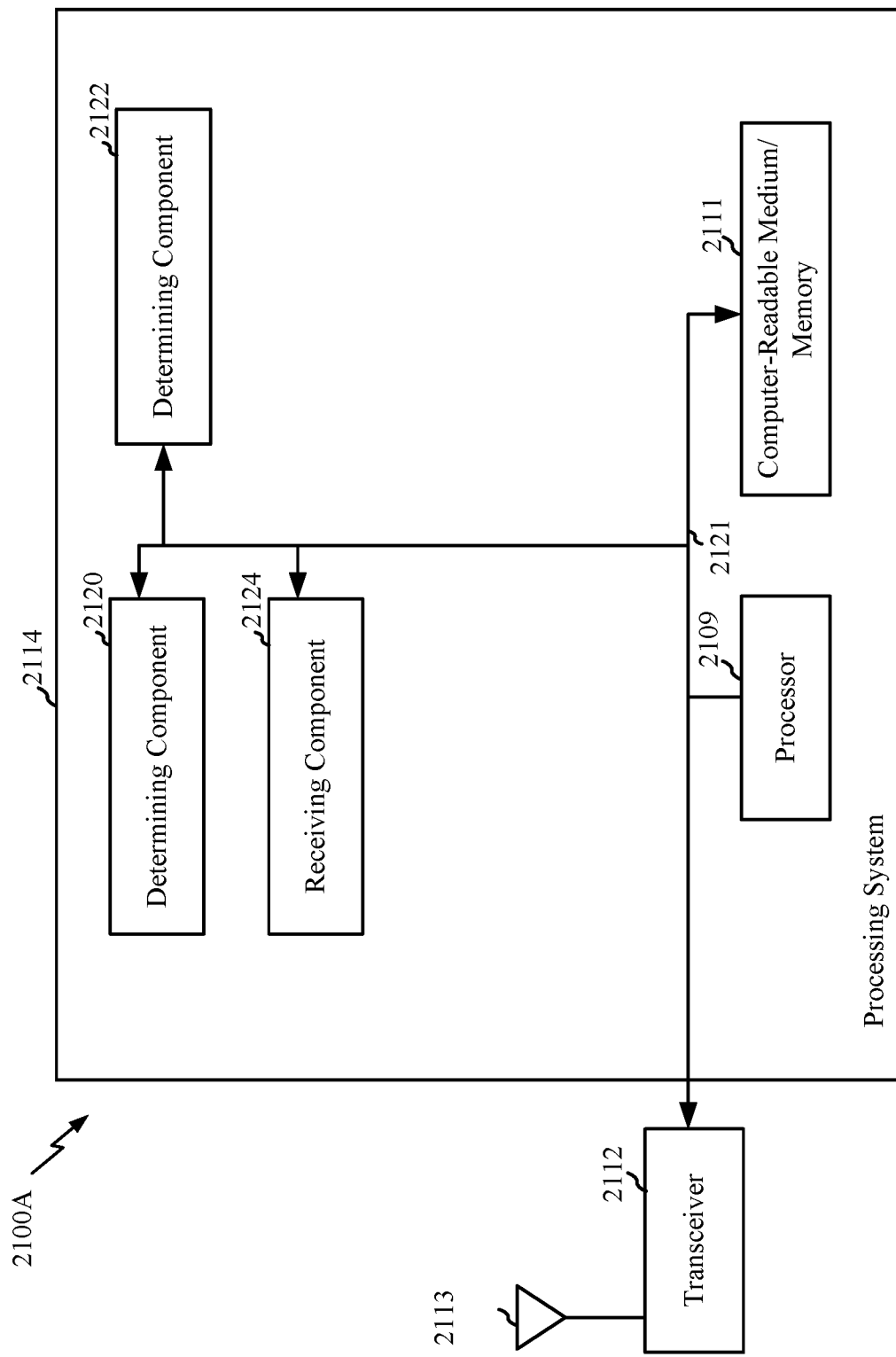
FIG. 21A illustrates a wireless communications device that may include various components configured to perform operations for the techniques disclosed herein, such as one or more of the operations illustrated in FIG. 21.

FIG. 21A illustrates a wireless communications device 2100A that may include various components (e.g., corresponding to means-plus-function components) configured to perform operations for the techniques disclosed herein, such as one or more of the operations illustrated in FIG. 21. The communications device 2100A includes a processing system 2114 coupled to a transceiver 2112. The transceiver 2112 is configured to transmit and receive signals for the communications device 2100A via an antenna 2113. The processing system 2114 may be configured to perform processing functions for the communications device 2100A, such as processing signals, etc.

The processing system 2114 includes a processor 2109 coupled to a computer-readable medium/memory 2111 via a bus 2121. In certain aspects, the computer-readable medium/memory 2111 is configured to store instructions that when executed by processor 2109, cause the processor 2109 to perform one or more of the operations illustrated in FIG. 21, or other operations for performing the various techniques discussed herein.

In certain aspects, the processing system 2114 further includes a determining component 2120 for performing one or more of the operations illustrated at 2102 in FIG. 21. Additionally, the processing system 2114 includes a determining component 2122 for performing one or more of the operations illustrated at 2104 in FIG. 21. Further, the processing system 2114 includes a receiving component 2124 for performing one or more of the operations illustrated at 2106 in FIG. 21.

The determining component 2120, the determining component 2122, and the receiving component 2124 may be coupled to the processor 2109 via bus 2121. In certain aspects, the determining component 2120, the determining component 2122, and the receiving component 2124 may be hardware circuits. In certain aspects, the determining component 2120, the determining component 2122, and the receiving component 2124 may be software components that are executed and run on processor 2109.

Figure 22:
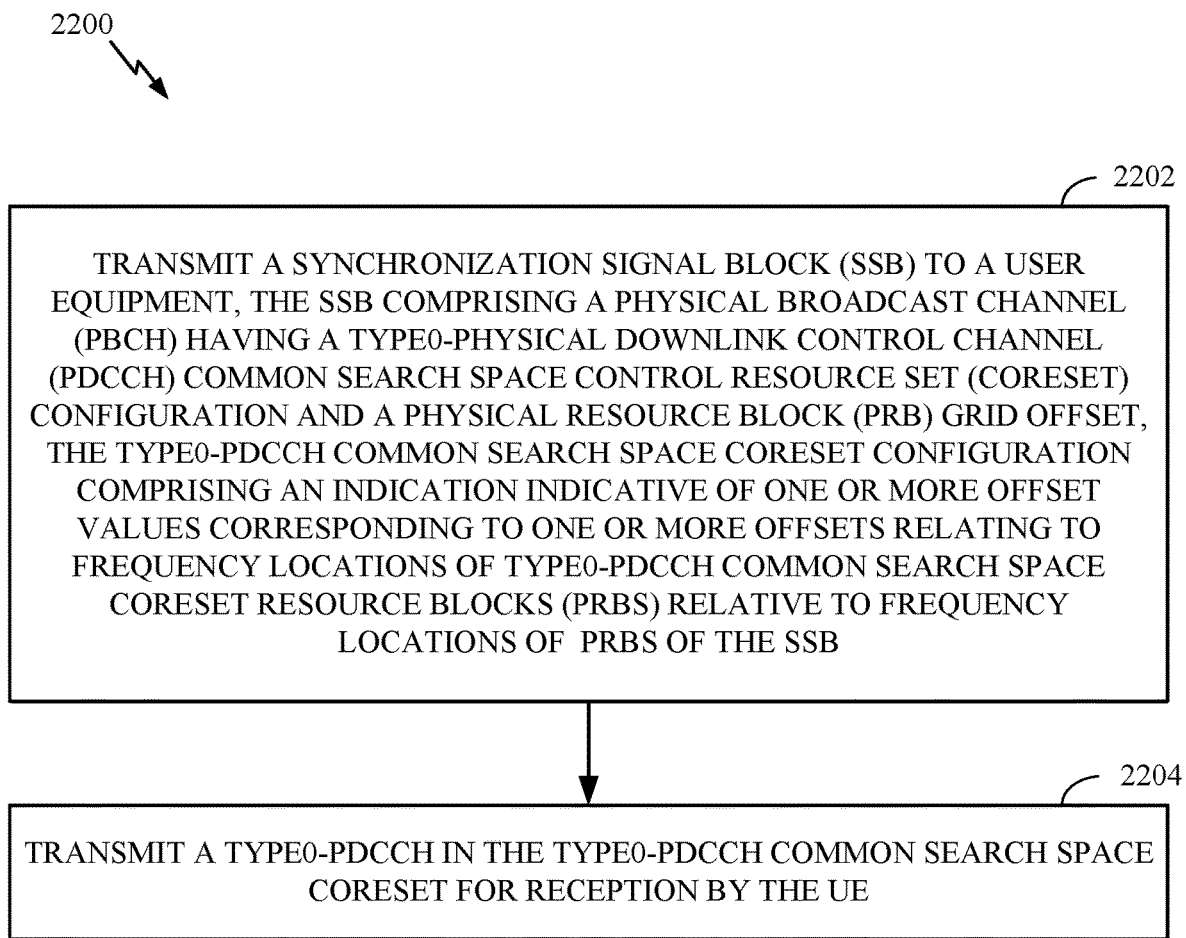
FIG. 22 illustrates example wireless communications operations for use by a user equipment (UE), in accordance with certain aspects of the present disclosure.

The embodiments described above related to operations performed by a UE. FIG. 22, however, describes operations performed by a base station.

FIG. 22 is a flow diagram illustrating example operations 2200 for wireless communications. Operations 2200 may be performed, for example, by a BS (e.g., BS 110). Operations 2200 begin, at 2202, by transmitting a synchronization signal block (SSB) to a user equipment, the SSB comprising a physical broadcast channel (PBCH) having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to one or more offsets relating to frequency locations of Type0-PDCCH common search space CORESET resource blocks (PRBs) relative to frequency locations of PRBs of the SSB. At 2204, operations 2000 continue by transmitting a Type0-PDCCH in the Type0-PDCCH common search space CORESET for reception by the UE.

Figure 22A:
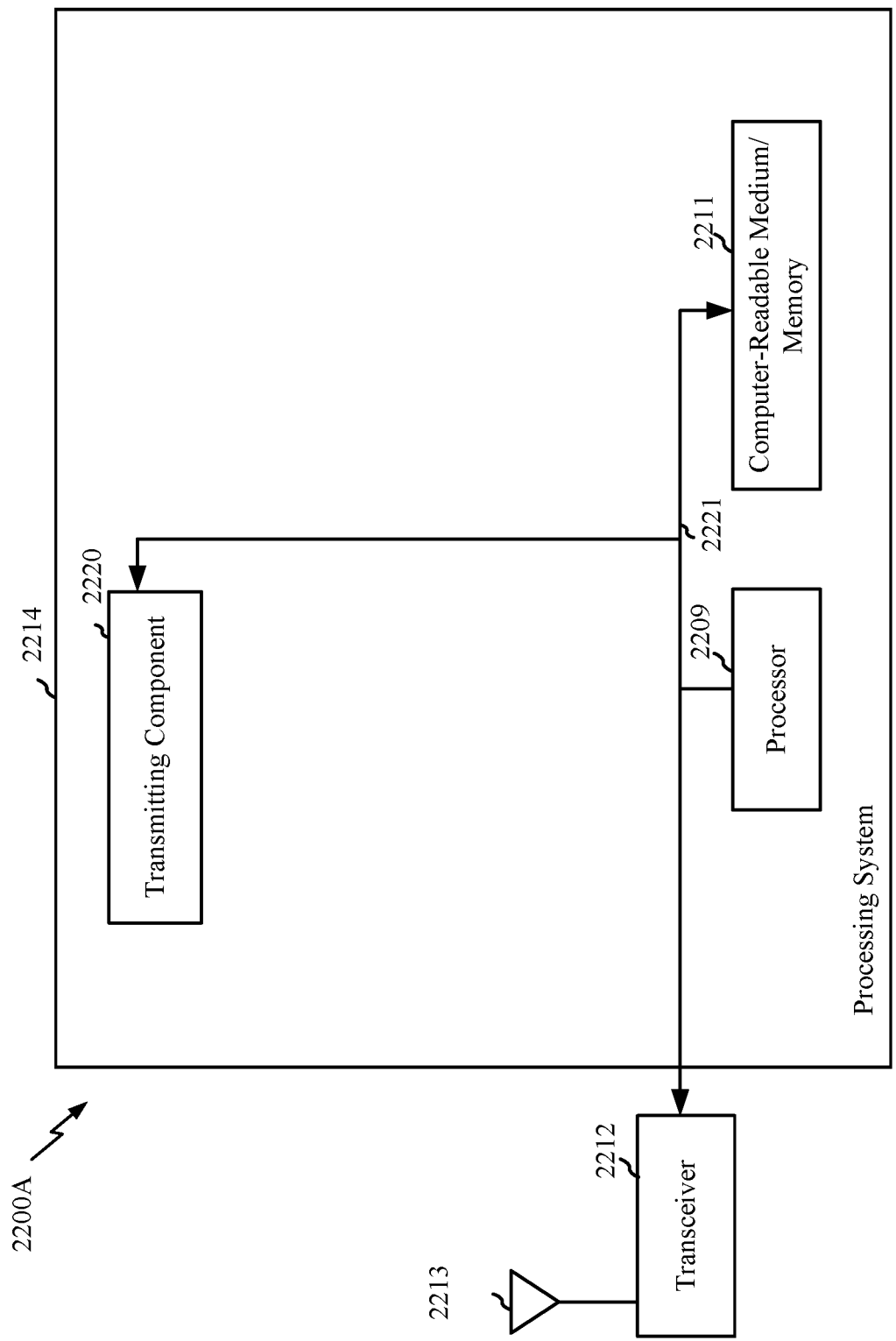
FIG. 22A illustrates a wireless communications device that may include various components configured to perform operations for the techniques disclosed herein, such as one or more of the operations illustrated in FIG. 22.

FIG. 22A illustrates a wireless communications device 2200A that may include various components (e.g., corresponding to means-plus-function components) configured to perform operations for the techniques disclosed herein, such as one or more of the operations illustrated in FIG. 22. The communications device 2200A includes a processing system 2214 coupled to a transceiver 2212. The transceiver 2212 is configured to transmit and receive signals for the communications device 2200A via an antenna 2213. The processing system 2214 may be configured to perform processing functions for the communications device 2200A, such as processing signals, etc.

The processing system 2214 includes a processor 2209 coupled to a computer-readable medium/memory 2211 via a bus 2221. In certain aspects, the computer-readable medium/memory 2211 is configured to store instructions that when executed by processor 2209, cause the processor 2209 to perform one or more of the operations illustrated in FIG. 22, or other operations for performing the various techniques discussed herein.

In certain aspects, the processing system 2214 further includes a transmitting component 2220 for performing one or more of the operations illustrated at 2202 and 2204 in FIG. 22.

The transmitting component 2220 may be coupled to the processor 2209 via bus 2221. In certain aspects, the transmitting component 2220 may be hardware circuits. In certain aspects, the transmitting component 2220 may be software components that are executed and run on processor 2209.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 11, 17, and 20.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a Type0-physical downlink control channel (PDCCH) common search space control resource set (CORESET) configuration and a physical resource block (PRB) grid offset in a synchronization signal block (SSB), the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB;
   aligning a PRB grid of the SSB with a PRB grid of the Type0-PDCCH common search space CORESET by applying the PRB grid offset;
   mapping the indication to the one or more offset values using a mapping stored by the UE, wherein the mapping is based on a subcarrier spacing of the Type0-PDCCH common search space CORESET;
   determining the frequency locations of the Type0-PDCCH common search space CORESET PRBs based on the one or more offset values and the frequency locations of the SSB PRBs; and
   receiving a Type0-PDCCH in the Type0-PDCCH common search space CORESET.

2. The method of claim 1, wherein the Type0-PDCCH common search space CORESET and the SSB are time division multiplexed.

3. The method of claim 1, wherein the Type0-PDCCH common search space CORESET and the SSB are frequency division multiplexed.

4. The method of claim 1, wherein the indication indicative of one or more offset values is further indicative of a bandwidth of the Type0-PDCCH common search space CORESET.

5. The method of claim 1, wherein each of the one or more offset values is based on at least one of an offset step size, a bandwidth of the Type0-PDCCH common search space CORESET, or the subcarrier spacing of the Type0-PDCCH common search space CORESET.

6. The method of claim 5, wherein the offset step size depends on at least one of the bandwidth of the Type0-PDCCH common search space CORESET, a subcarrier spacing of the SSB, or the subcarrier spacing of the Type0-PDCCH common search space CORESET.

7. The method of claim 1, wherein the mapping comprises a hash function.

8. The method of claim 1, wherein an offset value of the one or more offset values indicates an offset value of zero, and wherein an offset value of zero indicates that a smallest PRB of the SSB PRBs has a same frequency as a smallest PRB of the Type0-PDCCH common search space CORESET PRBs after the aligning.

9. An apparatus, comprising:
a memory comprising executable instructions; and
a processor in data communication with the memory and configured to execute the instructions to cause the apparatus to:
receive a Type0-physical downlink control channel (PDCCH) common search space control resource set (CORESET) configuration and a physical resource block (PRB) grid offset in a synchronization signal block (SSB), the Type0-PDCCH common search space CORESET configuration comprising an indication indicative of one or more offset values corresponding frequency locations of Type0-PDCCH common search space CORESET resource blocks (PRBs) relative to frequency locations of PRBs of the SSB;
align a PRB grid of the SSB with a PRB grid of the Type0-PDCCH common search space CORESET by applying the PRB grid offset;
map the indication to the one or more offset values using a mapping stored by the apparatus, wherein the mapping is based on a subcarrier spacing of the Type0-PDCCH common search space CORESET;
determine the frequency locations of the Type0-PDCCH common search space CORESET PRBs based on the one or more offset values and the frequency locations of the SSB PRBs; and
receive a Type0-PDCCH in the Type0-PDCCH common search space CORESET.

10. The apparatus of claim 9, wherein the Type0-PDCCH common search space CORESET and the SSB are time division multiplexed.

11. The apparatus of claim 9, wherein the Type0-PDCCH common search space CORESET and the SSB are frequency division multiplexed.

12. The apparatus of claim 9, wherein the indication indicative of one or more offset values is further indicative of a bandwidth of the Type0-PDCCH common search space CORESET.

13. The apparatus of claim 9, wherein each of the one or more offset values is based on at least one of an offset step size, a bandwidth of the Type0-PDCCH common search space CORESET, or the subcarrier spacing of the Type0-PDCCH common search space CORESET.

14. The apparatus of claim 13, wherein the offset step size depends on at least one of the bandwidth of the Type0-PDCCH common search space CORESET, a subcarrier spacing of the SSB, or the subcarrier spacing of the Type0-PDCCH common search space CORESET.

15. The apparatus of claim 9, wherein the mapping comprises a hash function.

16. The apparatus of claim 9, wherein an offset value of the one or more offset values indicates an offset value of zero, and wherein an offset value of zero indicates that a smallest PRB of the SSB PRBs has a same frequency as a smallest PRB of the Type0-PDCCH common search space CORESET PRBs after the aligning.

17. An apparatus, comprising:
means for receiving a Type0-physical downlink control channel (PDCCH) common search space control resource set (CORESET) configuration and a physical resource block (PRB) grid offset in a synchronization signal block (SSB), the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB;
means for aligning a PRB grid of the SSB with a PRB grid of the Type0-PDCCH common search space CORESET by applying the PRB grid offset;
means for mapping the indication to the one or more offset values using a mapping stored by the apparatus, wherein the mapping is based on a subcarrier spacing of the Type0-PDCCH common search space CORESET;
means for determining the frequency locations of the Type0-PDCCH common search space CORESET PRBs based on the one or more offset values and the frequency locations of the SSB PRBs; and
means for receiving a Type0-PDCCH in the Type0-PDCCH common search space CORESET.

18. A non-transitory computer readable medium having instructions stored thereon that, when executed by a user equipment (UE), cause the UE to:
receive a Type0-physical downlink control channel (PDCCH) common search space control resource set (CORESET) configuration and a physical resource block (PRB) grid offset in a synchronization signal block (SSB), the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB;
align a PRB grid of the SSB with a PRB grid of the Type0-PDCCH common search space CORESET by applying the PRB grid offset;
map the indication to the one or more offset values using a mapping stored by the UE, wherein the mapping is based on subcarrier spacing of the Type0-PDCCH common search space CORESET;
determine the frequency locations of the Type0-PDCCH common search space CORESET PRBs based on the one or more offset values and the frequency locations of the SSB PRBs; and
receive a Type0-PDCCH in the Type0-PDCCH common search space CORESET.

19. The apparatus of claim 17, wherein the Type0-PDCCH common search space CORESET and the SSB are frequency division multiplexed.

20. The apparatus of claim 17, wherein the indication indicative of one or more offset values is further indicative of a bandwidth of the Type0-PDCCH common search space CORESET.

21. The apparatus of claim 17, wherein each of the one or more offset values is based on at least one of an offset step size, a bandwidth of the Type0-PDCCH common search space CORESET, or the subcarrier spacing of the Type0-PDCCH common search space CORESET.

22. The apparatus of claim 21, wherein the offset step size depends on at least one of the bandwidth of the Type0-PDCCH common search space CORESET, a subcarrier spacing of the SSB, or the subcarrier spacing of the Type0-PDCCH common search space CORESET.

23. A non-transitory computer readable medium having instructions stored thereon that, when executed by a user equipment (UE), cause the UE to perform a method comprising:
receiving a Type0-physical downlink control channel (PDCCH) common search space control resource set (CORESET) configuration and a physical resource block (PRB) grid offset in a synchronization signal block (SSB), the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB;

aligning a PRB grid of the SSB with a PRB grid of the Type0-PDCCH common search space CORESET by applying the PRB grid offset;

mapping the indication to the one or more offset values using a mapping stored by the UE, wherein the mapping is based on a subcarrier spacing of the Type0-PDCCH common search space CORESET;

determining the frequency locations of the Type0-PDCCH common search space CORESET PRBs based on the one or more offset values and the frequency locations of the SSB PRBs; and receiving a Type0-PDCCH in the Type0-PDCCH common search space CORESET.

24. The non-transitory computer readable medium of claim 23, wherein the Type0-PDCCH common search space CORESET and the SSB are time division multiplexed.

25. The non-transitory computer readable medium of claim 23, wherein the Type0-PDCCH common search space CORESET and the SSB are frequency division multiplexed.

26. The non-transitory computer readable medium of claim 23, wherein the indication indicative of one or more offset values is further indicative of a bandwidth of the Type0-PDCCH common search space CORESET.

27. The non-transitory computer readable medium of claim 23, wherein each of the one or more offset values is based on at least one of an offset step size, a bandwidth of the Type0-PDCCH common search space CORESET, or the subcarrier spacing of the Type0-PDCCH common search space CORESET.

28. The non-transitory computer readable medium of claim 27, wherein the offset step size depends on at least one of the bandwidth of the Type0-PDCCH common search space CORESET, a subcarrier spacing of the SSB, or the subcarrier spacing of the Type0-PDCCH common search space CORESET.

29. A method for wireless communications by a user equipment (UE), comprising:
determining frequency locations of Type0-physical downlink control channel (PDCCH) common search space control resource set (CORESET) in a synchronization signal block (SSB) based on a mapping based on a subcarrier spacing of the Type0-PDCCH common search space CORESET;
determining frequency locations of Type0a-physical downlink control common search space CORESET in the SSB based on the frequency locations of the Type0-PDCCH common search space CORESET; and
receiving the Type0a-PDCCH common search space CORESET.

30. The method of claim 29, wherein determining the frequency locations of Type0-PDCCH common search space CORESET further comprises:
receiving a Type0 PDCCH common search space CORESET configuration and a physical resource block (PRB) grid offset in the SSB, the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB;

aligning a PRB grid of the SSB with a PRB grid of the Type0-PDCCH common search space CORESET by applying the PRB grid offset;

mapping the indication to the one or more offset values using the mapping stored by the UE; and determining the frequency locations of the Type0-PDCCH common search space CORESET PRBs based on the one or more offset values and the frequency locations of the SSB PRBs.

31. A method for wireless communications by a base station (BS), comprising:
transmitting a synchronization signal block (SSB) to a user equipment (UE), the SSB having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB, wherein the indication is mapped to the one or more offset values based on a subcarrier spacing of the Type0-PDCCH common search space CORESET;
transmitting a Type0-PDCCH in the Type0-PDCCH common search space CORESET for reception by the UE.

32. The method of claim 31, wherein the Type0-PDCCH common search space CORESET and the SSB are time division multiplexed.

33. The method of claim 31, wherein the Type0-PDCCH common search space CORESET and the SSB are frequency division multiplexed.

34. The method of claim 31, wherein the indication indicative of one or more offset values is further indicative of a bandwidth of the Type0-PDCCH common search space CORESET.

35. The method of claim 26, wherein each of the one or more offset values is based on at least one of an offset step size, a bandwidth of the Type0-PDCCH common search space CORESET, or the subcarrier spacing of the Type0-PDCCH common search space CORESET.

36. The method of claim 35, wherein the offset step size depends on at least one of the bandwidth of the Type0-PDCCH common search space CORESET, a subcarrier spacing of the SSB, or the subcarrier spacing of the Type0-PDCCH common search space CORESET.

37. An apparatus, comprising:
a memory comprising executable instructions; and
a processor in data communication with the memory and configured to execute the instructions to cause the apparatus to:
transmit a synchronization signal block (SSB) to a user equipment (UE), the SSB having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB, wherein the indication is mapped to the one or more offset values based on a subscriber spacing of the Type0-PDCCH common search space CORESET; and transmit a Type0-PDCCH common search space CORESET for reception by the UE.

38. The apparatus of claim 37, wherein the Type0-PDCCH common search space CORESET and the SSB are time division multiplexed.

39. The apparatus of claim 37, wherein the Type0-PDCCH common search space CORESET and the SSB are frequency division multiplexed.

40. The apparatus of claim 37, wherein the indication indicative of one or more offset values is further indicative of a bandwidth of the Type0-PDCCH common search space CORESET.

41. The apparatus of claim 37, wherein each of the one or more offset values is based on at least one of an offset step size, a bandwidth of the Type0-PDCCH common search space CORESET, or the subcarrier spacing of the Type0-PDCCH common search space CORESET.

42. The apparatus of claim 41, wherein the offset step size depends on at least one of the bandwidth of the Type0-PDCCH common search space CORESET, a subcarrier spacing of the SSB, or the subcarrier spacing of the Type0-PDCCH common search space CORESET.

43. An apparatus, comprising:
means for transmitting a synchronization signal block (SSB) to a user equipment (UE), the SSB having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB, wherein the indication is mapped to the one or more offset values based on a subscriber spacing of the Type0-PDCCH common search space CORESET; and
means for transmitting a Type0-PDCCH in the Type0-PDCCH common search space CORESET for reception by the UE.

44. The apparatus of claim 43, wherein the Type0-PDCCH common search space CORESET and the SSB are time division multiplexed.

45. The apparatus of claim 43, wherein the Type0-PDCCH common search space CORESET and the SSB are frequency division multiplexed.

46. The apparatus of claim 43, wherein the indication indicative of one or more offset values is further indicative of a bandwidth of the Type0-PDCCH common search space CORESET.

47. The apparatus of claim 43, wherein each of the one or more offset values is based on at least one of an offset step size, a bandwidth of the Type0-PDCCH common search space CORESET, or the subcarrier spacing of the Type0-PDCCH common search space CORESET.

48. The apparatus of claim 47, wherein the offset step size depends on at least one of the bandwidth of the Type0-PDCCH common search space CORESET, a subcarrier spacing of the SSB, or the subcarrier spacing of the Type0-PDCCH common search space CORESET.

49. A non-transitory computer readable medium having instructions stored thereon that, when executed by a base station (BS), cause the BS to:
transmit a synchronization signal block (SSB) to a user equipment (UE), the SSB having a Type0-physical downlink control channel (PDCCH) common search space control resource set (CORESET) configuration and a physical resource block (PRB) grid offset, the Type0-PDCCH common search space CORESET configuration comprising an indication indicative of one or more offset values corresponding to frequency locations of Type0-PDCCH common search space CORESET resource blocks (PRBs) relative to frequency locations of PRBs of the SSB, wherein the indication is mapped to the one or more offset values based on a subscriber spacing of the Type0-PDCCH common search space CORESET; and
transmit a Type0-PDCCH in the Type0-PDCCH common search space CORESET for reception by the UE.

50. The non-transitory computer readable medium of claim 49, wherein the Type0-PDCCH common search space CORESET and the SSB are time division multiplexed.

51. The non-transitory computer readable medium of claim 49, wherein the Type0-PDCCH common search space CORESET and the SSB are frequency division multiplexed.

52. The non-transitory computer readable medium of claim 49, wherein the indication indicative of one or more offset values is further indicative of a bandwidth of the Type0-PDCCH common search space CORESET.

53. The non-transitory computer readable medium of claim 49, wherein each of the one or more offset values is based on at least one of an offset step size, a bandwidth of the Type0-PDCCH common search space CORESET, or the subcarrier spacing of the Type0-PDCCH common search space CORESET.

54. The non-transitory computer readable medium of claim 53, wherein the offset step size depends on at least one of the bandwidth of the Type0-PDCCH common search space CORESET, a subcarrier spacing of the SSB, or the subcarrier spacing of the Type0-PDCCH common search space CORESET.

* * * * *